US009795932B2

(12) United States Patent
Yokota et al.

(10) Patent No.: US 9,795,932 B2
(45) Date of Patent: Oct. 24, 2017

(54) POROUS HOLLOW FIBER MEMBRANE AND A POROUS HOLLOW FIBER MEMBRANE FOR THE TREATMENT OF A PROTEIN-CONTAINING LIQUID

(75) Inventors: Hideyuki Yokota, Osaka (JP); Noriaki Kato, Ohtsu (JP); Hirofumi Ogawa, Ohtsu (JP); Junsuke Morita, Ohtsu (JP)

(73) Assignee: TOYO BOSEKI KABUSHIKI KAISHA, Osaka-shi (JP)

( * ) Notice: Subject to any disclaimer, the term of this patent is extended or adjusted under 35 U.S.C. 154(b) by 1064 days.

(21) Appl. No.: 13/142,125

(22) PCT Filed: Dec. 24, 2009

(86) PCT No.: PCT/JP2009/071416
§ 371 (c)(1),
(2), (4) Date: Jun. 24, 2011

(87) PCT Pub. No.: WO2010/074136
PCT Pub. Date: Jul. 1, 2010

(65) Prior Publication Data
US 2011/0259816 A1    Oct. 27, 2011

(30) Foreign Application Priority Data

Dec. 25, 2008  (JP) ................................ 2008-329579
Jun. 30, 2009  (JP) ................................ 2009-155133

(51) Int. Cl.
*B01D 69/08*     (2006.01)
*B01D 71/68*     (2006.01)
*B01D 69/02*     (2006.01)

(52) U.S. Cl.
CPC .......... *B01D 71/68* (2013.01); *B01D 69/087* (2013.01); *B01D 69/02* (2013.01); *B01D 69/08* (2013.01);

(Continued)

(58) Field of Classification Search
CPC .......... B01D 2325/02; B01D 2325/021; B01D 2325/023; B01D 2325/025; B01D 69/08; B01D 69/081; B01D 71/68
See application file for complete search history.

(56) References Cited

U.S. PATENT DOCUMENTS 5,340,480 A  *  8/1994  Kawata et al. .......... 210/500.23
6,432,309 B1 *  8/2002  Fuke .................. B01D 67/0011
                                                     210/500.23

(Continued)

FOREIGN PATENT DOCUMENTS

EP       0568045     * 10/1996
EP       1 206 961 A1   5/2002

(Continued)

OTHER PUBLICATIONS

English language machine translation of JPH10243999, No Date, 10 pages.*

(Continued)

*Primary Examiner* — Pranav Patel
(74) *Attorney, Agent, or Firm* — Westerman, Hattori, Daniels & Adrian, LLP

(57) ABSTRACT

The purpose of the present invention is to provide a porous hollow fiber membrane that can efficiently separate and remove the substances to be removed such as small-particle virus contained in a solution and, at the same time, useful recovering substances such as protein can be efficiently permeated and the decrease of its transmission rate with elapse of time is small. The porous hollow fiber membrane of the present invention is characterized in that the filtration downstream surface thereof has dot-shaped or slit-shaped pores, the filtration upstream surface thereof is a network structure or a fine particle aggregate structure, the central region of the membrane is composed of a substantially homogeneous structure, the membrane wall is composed of (Continued)

a structure having substantially no macrovoids, the permeability for pure water is 10 to 300 L/(h·m²·bar) and the permeability for a 0.1% by weight solution of bovine γ-globulin is 30 to 100% of the permeability for pure water. Also, the hollow fiber membrane is characterized in that the permeability for a 0.1% by weight solution of bovine γ-globulin in a 20 mmol/L phosphate buffer is 30 to 100% of the permeability for a 0.1% by weight solution of bovine γ-globulin in a 20 mmol/L phosphate-buffered physiological saline solution.

11 Claims, 6 Drawing Sheets

(52) U.S. Cl.
CPC .... *B01D 69/081* (2013.01); *B01D 2239/1233* (2013.01); *B01D 2239/1258* (2013.01); *B01D 2325/02* (2013.01); *B01D 2325/021* (2013.01); *B01D 2325/022* (2013.01); *B01D 2325/023* (2013.01); *B01D 2325/20* (2013.01)

(56) References Cited

U.S. PATENT DOCUMENTS

| | | | |
|---|---|---|---|
| 6,797,169 B1 | 9/2004 | Ide et al. | |
| 2004/0023017 A1 | 2/2004 | Nagoya et al. | |
| 2006/0016748 A1* | 1/2006 | Koguma et al. | 210/490 |
| 2007/0084788 A1 | 4/2007 | Moya et al. | |
| 2007/0199891 A1 | 8/2007 | Mabuchi et al. | |
| 2008/0000828 A1* | 1/2008 | Wechs | B01D 67/0013 210/496 |
| 2009/0078641 A1* | 3/2009 | Monden et al. | 210/321.6 |
| 2009/0110900 A1* | 4/2009 | Yokota | B01D 69/02 428/221 |
| 2010/0159143 A1 | 6/2010 | Moya et al. | |
| 2010/0190965 A1 | 7/2010 | Yamaguchi et al. | |
| 2011/0031184 A1* | 2/2011 | Krause | B01D 63/02 210/500.23 |

FOREIGN PATENT DOCUMENTS

| | | |
|---|---|---|
| EP | 1 552 878 A1 | 7/2005 |
| EP | 1 733 783 A1 | 12/2006 |
| EP | 1 775 016 A1 | 4/2007 |
| JP | 61-90672 A | 5/1986 |
| JP | 62-117812 A | 5/1987 |
| JP | 01-254204 A | 10/1989 |
| JP | 03-146067 A | 6/1991 |
| JP | 4-50054 B2 | 8/1992 |
| JP | H10243999 * | 9/1998 |
| JP | 2005-65725 A | 3/2005 |
| JP | 2006-187768 A | 7/2006 |
| JP | 2006-340977 A | 12/2006 |
| JP | 2007-136449 A | 6/2007 |
| JP | 2007-215569 A | 8/2007 |
| JP | 2008-82728 A | 4/2008 |
| JP | 2008-237893 A | 10/2008 |
| WO | 03/026779 A1 | 4/2003 |
| WO | 2004/035180 A1 | 4/2004 |
| WO | WO2007102528 * | 9/2007 |
| WO | WO2008046779 * | 4/2008 |
| WO | 2008/156124 A1 | 12/2008 |

OTHER PUBLICATIONS

Extended European Search Report dated Apr. 4, 2013, issued in corresponding European Patent Application No. 09834934.3.
PDA Journal of GMP and Validation in Japan, Vo. 7, No. 1, 2005, p. 44.
Dispatch No. 1047 for Drugs (Aug. 30, 1999) (Notification from department of Drug Safety, Ministry of Health and Welfare to the Presidennt of the Japan Blook Products Association).
K. Murai et al. "The practical protocols on viral clearance study for the application PDA Japan, Bio-virus safety committee, viral clearance subcommittee", PDA Journal of GMP and Validation in Japan, vol., 9, No. 1, 2007, pp. 6-31.
A. Higuchi et al. "Effect of aggregated protein sized on the flux of protein solution through microporous membranes", Journal of Membrane Science, 236, 2004, pp. 137-144.
A. Higuchi et al. "Enhanced microfiltration of [Gamma]-globulin solution upon treatment of NaCI addition and/or DNase digestion", Journal of Membrane Science, 210, 2002, pp. 369-378.
International Search Report of PCT/JP2009/071416, mailing date Mar. 9, 2010.

* cited by examiner

US 9,795,932 B2

POROUS HOLLOW FIBER MEMBRANE AND A POROUS HOLLOW FIBER MEMBRANE FOR THE TREATMENT OF A PROTEIN-CONTAINING LIQUID

TECHNICAL FIELD OF THE INVENTION

The present invention relates to a porous hollow fiber membrane which is suitable for the separation of fine particles such as virus contained in an aqueous fluid such as a protein solution. More particularly, the present invention relates to a porous hollow fiber membrane suitable for the separation of fine particles such as virus from an aqueous fluid containing a component such as protein, characterized in that, it is preferably composed of a hydrophobic polymer and a hydrophilic polymer, the filtration downstream surface thereof has dot-shaped or slit-shaped pores, the filtration upstream surface thereof is a network structure or a fine particle aggregate structure, the central region of the membrane is composed of a substantially homogeneous structure, the membrane wall is composed of a structure having substantially no macrovoids, the permeability for pure water is 10 to 300 L/(h·m²·bar) and the permeability for a 0.1% by weight solution of bovine γ-globulin is 30 to 100% of the permeability for pure water.

Further, the present invention relates to a porous hollow fiber membrane for the treatment of a protein-containing liquid, characterized in that, it is preferably composed of a hydrophobic polymer and a hydrophilic polymer, the filtration downstream surface thereof has dot-shaped or slit-shaped pores, the filtration upstream surface thereof is a network structure or a fine particle aggregate structure, the central region of the membrane is composed of a substantially homogeneous structure, the membrane wall is composed of a structure having substantially no macrovoids, the permeability for pure water is 10 to 300 L/(h·m²·bar) and the permeability for a 0.1% by weight solution of bovine γ-globulin in a 20 mmol/L phosphate buffer is 30 to 100% of the permeability for a 0.1% by weight solution of bovine γ-globulin in a 20 mmol/L phosphate-buffered physiological saline solution.

BACKGROUND ART

Hollow fiber membranes for a purpose of treatment of aqueous fluids have been widely utilized for industrial use such as microfiltration or ultrafiltration and for medical use such as hemodialysis, hemofiltration or blood diafiltration. Particularly in recent years, there has been a demand for a technology where pathogenic substances such as virus are removed from a solution of protein which is a useful ingredient during the steps for the manufacture of biopharmaceuticals and blood products so as to enhance the safety.

According to the non-patent document 1, it is said to be desirable, with regard to the steps of removal and inactivation of virus in a fractionated plasma preparation, to grapple with more than two different viral inactivation and removal steps. According to the description of the non-patent document 2, it is mentioned that the LRV to be achieved as the target value is about 4. Further, according to the non-patent document 3, there is a clear description in this document reading "Particularly with regard to the steps of removal and inactivation of virus, 'it is desirable to consider in more than two different viral inactivation and removal steps' in 'About the guideline concerning the security of safety of fractionated plasma preparations against virus' (Dispatch No. 1047 for Drugs (Aug. 30, 1999)) and, with regard to the specific virus, it is requested that the sum of virus clearance indexes in the manufacturing steps (total virus clearance indexes) is 9 or more." Incidentally, the above term LRV has nearly the same meaning as the virus clearance index R which is mentioned as follows in the non-patent document 1.

Virus clearance index $R = \log((V1 \times T1)/(V2 \times T2))$

V1 Volume before the treatment of the step
T1 Titer of virus before the treatment of the step
V2 Volume after the treatment of the step
T2 Titer of virus after the treatment of the step As to a method for removal/inactivation of virus, there are a heating treatment, an optical treatment such as irradiation of gamma ray or ultraviolet ray, a chemical treatment such as a low-pH treatment, a precipitating fractionation such as fractionation by ethanol or fractionation by ammonium sulfate, a filtration by membrane, etc. and, in the removal of virus from a protein solution, a method of filtering by membrane which does not result in the denaturation of protein is attracting public attention.

On the other hand, in the steps for the manufacture of biopharmaceuticals and blood products, protein which is a useful ingredient should be efficiently permeated and recovered in view of the productivity. However, when the object for the separation and removal is a small-sized virus such as parvovirus, it has been difficult to simultaneously satisfy both of the removing characteristic for virus and the permeating characteristic for useful protein.

In the patent document 1, there is a disclosure for a hydrophilic porous membrane where the relation among an average permeability during 5 minutes from the initiation of the filtration (globulin permeability A), an average permeability during 5 minutes since the stage being elapsed 55 minutes from the initiation of the filtration (globulin permeability B), and the maximum pore size when 3 wt % bovine immunoglobulin where the percentage of the monomer is not less than 80 wt % is subjected to a low-pressure filtration at 0.3 MPa is expressed in terms of parameters. The constituent features of this membrane are as follows.

(1) Maximum pore size 10 to 100 nm
(2) Globulin permeability A>0.015×maximum pore size $(nm)^{2.75}$
(3) Globulin permeability B/globulin permeability A>0.2

Now, as mentioned in lines 21 to 27, page 3 of the specification, the requirement (1) merely mentions the pore size which is necessitated for the removal of infectious virus. The requirement (2) demands that the globulin permeability A is more than the value calculated from the maximum pore size of the micropore and, since it is obvious in a membrane for a purpose of removing the virus from a protein solution that the more the permeability for the protein solution, the better, it merely mentions the aimed characteristics. The requirement (3) demands that the permeability for a protein solution does not lower with elapse of time and that is also a mere description for the aimed characteristics which is demanded in the membrane where the removal of virus from a protein solution is a target. Besides the above, there are descriptions in subclaims for a hydrophilic porous membrane where the logarithmic removal rate to porcine parvovirus is 3 or more, for a hydrophilic microporous membrane where the accumulated transmission amount during 3 hours from the initiation of the filtration when 3 wt % bovine immunoglobulin where the ratio of the monomer is not less than 80 wt % is subjected to a low-pressure filtration at 0.3 MPa is not less than 50 liters/m², etc. However, they merely mention the aimed characteristics of the membrane for a purpose of removal of virus from a protein solution where the virus is efficiently removed and the transmission amount of the protein solution is high and they do not give useful and specific information for an object of obtaining a membrane having a high transmission of protein and a high removal of virus.

There is also a disclosure for a finely porous membrane which has a coarse and big structure layer having a big porosity and a tight layer having a small porosity. To begin with however, the discussion made therein is substantially for a hollow fiber membrane made of poly(vinylidene fluoride) (hereinafter, it will be abbreviated as PVDF) which is apt to form a homogeneous structure by means of heat-induced phase separation. Thus, it is difficult to directly apply such an art, for example, to a raw material such as a polysulfone type resin which has been widely used as a material for the hemodialysis membrane due to its high water transmission ability.

The patent document 2 discloses a microporous membrane which has a coarse structure layer having a big porosity and a tight layer having a small porosity but, again, the thing substantially predicted as a material herein is PVDF. PVDF is excellent in terms of physical strength but, on the other hand, since it is a hydrophobic material, it is apt to result in adsorption of protein, etc. and also in staining and blocking of the membrane whereupon the filtration rate quickly lowers. In order to improve such an undesirable characteristics, it is necessary to make the membrane hydrophilic but, generally, a membrane where PVDF is a material is to be modified to a hydrophilic one by means of post-treatment after preparing the membrane. Thus, as compared with the polysulfone resin where it is usual to make into the membrane in a blended state with hydrophilic polymer, there is a disadvantage that troublesome manufacturing steps are resulted.

The patent document 3 discloses an ultrafiltration membrane for retaining the virus having the initial LRV of at least 4.0 to PhiX 174 where the surface is made hydrophilic with hydroxyalkyl cellulose. In the art disclosed therein, hydrophilization is conducted by a specific hydrophilic polymer and is lacking in broad applicability. Although a blend of polysulfone, etc. with a hydrophilic polymer such as polyvinylpyrrolidone is also exemplified, a hydrophilizing treatment using hydroxyalkyl cellulose is still inevitable. Further, although a hollow fiber type is allowed as well, a flat membrane type is substantially predicted and there is no sufficient explanation for preparing a hollow fiber membrane type.

The patent documents 4 and 5 disclose a method for removal of virus using a porous polymer where the ratio (Jp/Jw) of the permeability for a 5% by weight aqueous solution of human serum albumin (Jp) to the permeability for pure water (Jw) is not less than 1/50. In the patent documents 4 and 5, the facts that an inhibition coefficient of coliphage øX174 is not less than 2 and that an inhibition coefficient of gold colloid of 30 nm particle size is not less than 1 were mentioned as the constituent features, respectively. Anyway however, in the membrane characteristics mentioned therein merely stipulate the lowest limit of aimed characteristics as a membrane for a purpose of removal of virus from a protein solution. Thus, there is given no useful and specific information therein for the target of preparing a membrane where protein is highly transmitted and virus is highly removed. Moreover, the main membrane disclosed therein uses cellulose as a material and, since its strength in a state of being wet by water is low, it is difficult to highly set the pressure to be applied for filtration and it is not possible to achieve a high permeability.

The patent document 6 discloses a macromolecular porous hollow fiber membrane having such a pore structure that, from the inner wall surface to the inside wall, the in-plane void rate decreases initially and, after at least one minimum area, it increases again in the outer wall area and also discloses a method for removal of virus where an aqueous solution of protein is filtered using said membrane. When the membrane structure disclosed herein is briefly mentioned, it is a hollow fiber membrane where the pore size of the membrane wall becomes in the order of rough-dense-rough in the membrane thickness direction. It has been said to be suitable for the removal of virus in high efficiency and the recovery of protein in high transmission efficiency without denaturing protein that there are such an inclined structure and the specific average pore size. Although various macromolecular substances are exemplified as the material, it is substantially an art using regenerated cellulose and it is difficult to widely develop the art disclosed therein for many materials. Further, the disadvantages of a cellulose material were as mentioned already.

The non-patent documents 4 and 5 report that aggregation of protein is resolved by addition of a salt or by a treatment with DNAse, whereby the transmission rate of protein and the permeability for protein solution are enhanced. Although it is able to be well predicted that the salt concentration affects the existing state of protein and that the transmission efficiency is enhanced as such, no attention is paid for the fact that the salt concentration affects the interaction of membrane surface with protein whereby the transmission efficiency is increased or decreased.

PRIOR ART DOCUMENTS

Patent Documents

Patent Document 1: WO 2004/035180
Patent Document 2: WO 2003/026779
Patent Document 3: Japanese Patent Application Laid-Open (JP-A) No. 2007-136449
Patent Document 4: Japanese Patent Application Laid-Open (JP-A) No. 254204/89
Patent Document 5: Japanese Patent Application Laid-Open (JP-A) No. 146067/91
Patent Document 6: Japanese Patent Pregrant Publication (JP-B) No. 050054/92

Non-Patent Documents

Non-Patent Document 1: Dispatch No. 1047 for Drugs (Aug. 30, 1999) (Notification from Department of Drug Safety, Ministry of Health and Welfare to the President of the Japan Blood Products Association)
Non-Patent Document 2: PDA Journal of GMP and Validation in Japan, Vol. 7, No. 1, p. 44 (2005)
Non-Patent Document 3: PDA Journal of GMP and Validation in Japan, Vol. 9, No. 1, p. 6 (2007)
Non-Patent Document 4: Journal of Membrane Science, 210 (2002), 369-378
Non-Patent Document 5: Journal of Membrane Science, 236 (2004), 137-144

DISCLOSURE OF THE INVENTION

Problem that the Invention is to Solve

An object of the present invention is to provide a porous hollow fiber membrane where the substances to be removed such as virus contained in a solution are able to be efficiently separated and removed and, at the same time, useful substances to be recovered such as protein is able to be efficiently transmitted and the decrease in the transmitting characteristics thereof with elapse of time is small.

Means for Solving the Problem

The present inventors have conducted an intensive investigation for solving the above problem and have been able to solve the problem whereupon the present invention has been achieved.

Thus, the porous hollow fiber membrane of the present invention 1 is characterized in (1) that the filtration downstream surface thereof has dot-shaped or slit-shaped pores, the filtration upstream surface thereof is a network structure or a fine particle aggregate structure, the central region of the membrane is composed of a substantially homogeneous structure, the membrane wall is composed of a structure having substantially no macrovoids, the permeability for pure water is 10 to 300 L/(h·m²·bar) and the permeability for a 0.1% by weight solution of bovine γ-globulin is 30 to 100% of the permeability for pure water, (2) that the inner diameter is 200 to 400 μm and the membrane thickness is 50 to 200 μm, (3) that it contains a hydrophobic polymer and a hydrophilic polymer, (4) that the hydrophobic polymer is polysulfone-based polymers, (5) that the hydrophilic polymer is polyvinylpyrrolidone and (6) that it is a membrane to be used for the separation of virus from a protein solution.

Also, the porous hollow fiber membrane for the treatment of a protein-containing liquid of the present invention 2 is characterized in (7) that the filtration downstream surface thereof has dot-shaped or slit-shaped pores, the filtration upstream surface thereof is a network structure or a fine particle aggregate structure, the central region of the membrane is composed of a substantially homogeneous structure, the membrane wall is composed of a structure having substantially no macrovoids, the permeability for pure water is 10 to 300 L/(h·m²·bar) and the permeability for a 0.1% by weight solution of bovine γ-globulin in a 20 mmol/L phosphate buffer is 30 to 100% of the permeability for a 0.1% by weight solution of bovine γ-globulin in a 20 mmol/L phosphate-buffered physiological saline solution.

Advantages of the Invention

The porous hollow fiber membrane of the present invention can be utilized for the separation of virus from a protein solution and particularly can efficiently remove the virus and, at the same time, protein is efficiently transmitted therethrough and the decrease of the transmission efficiency with elapse of time is small and, accordingly, it can be preferably utilized as a membrane for the removal of pathogenic substances such as virus from a solution of protein which is a useful component.

BEST MODE FOR CARRYING OUT THE INVENTION

The present invention will now be illustrated in detail as hereunder.

Figure 1:
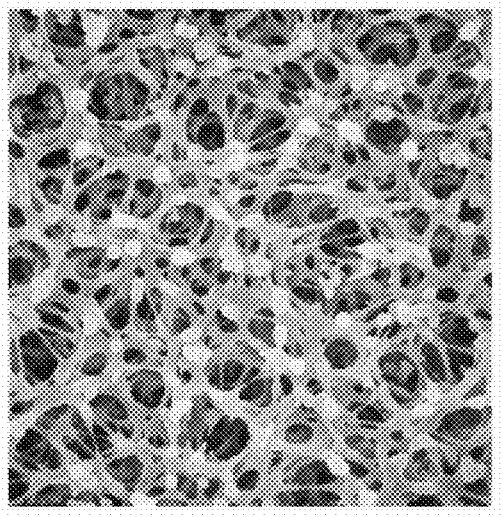
FIG. 1 is an example of the network structure.
Figure 2:
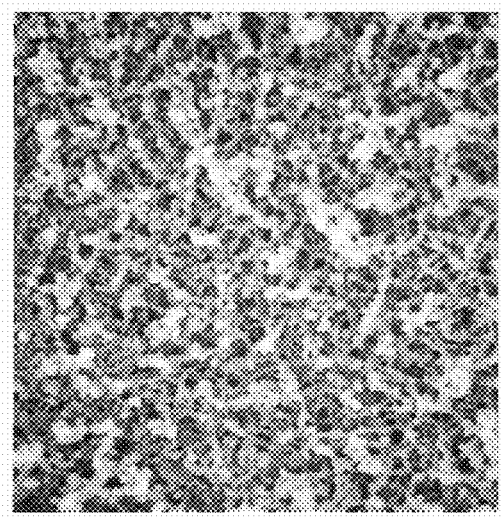
FIG. 2 is an example of the aggregate structure of the fine particles.
Figure 3:
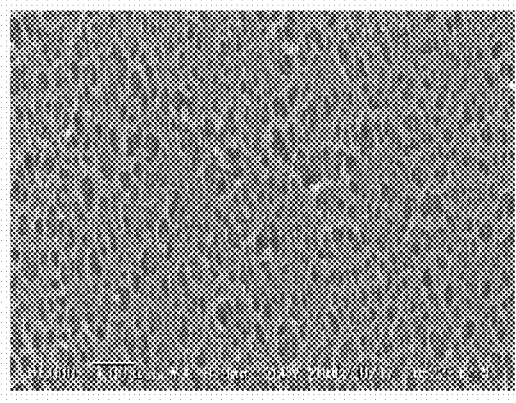
FIG. 3 is an example of the dot-shaped pore structure.
Figure 4:
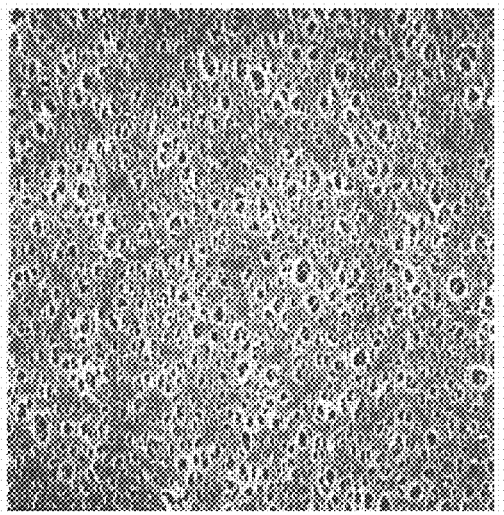
FIG. 4 is an example of the dot-shaped pore structure.
Figure 5:
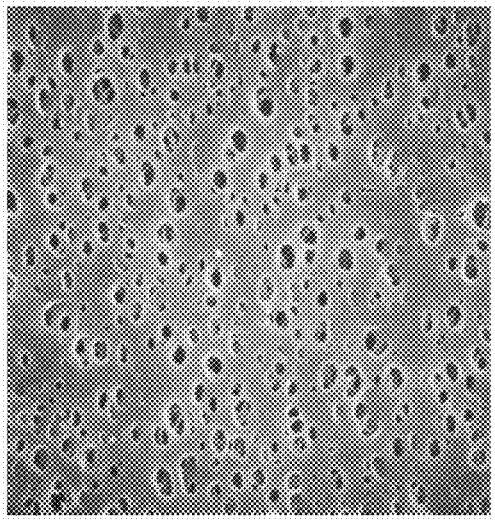
FIG. 5 is an example of the dot-shaped pore structure.
Figure 6:
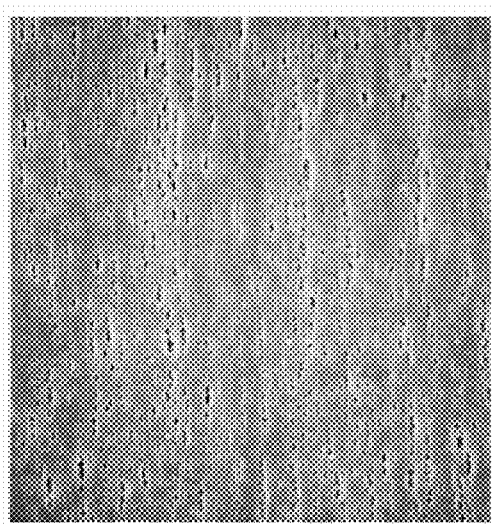
FIG. 6 is an example of the slit-shaped pore structure.

It is preferred that, in the porous hollow fiber membrane of the present invention, the filtration downstream surface has dot-shaped or slit-shaped pores and the filtration upstream surface comprises a network structure or a fine particle aggregate structure. The expression reading "has dot-shaped or slit-shaped pores" means that, when the image of 10,000 magnifications taken by a scanning electron microscope (SEM) was observed by naked eye, the region (pore part or empty part) in which no structure constituting part exists is present in circles, ellipses or slits where the region (substantial or filled part) in which structure constituting part exits is a background. The "network structure" means a structure where the substantial part spreads as a network form in a three-dimensional manner while the "fine particle aggregate structure" means a structure where many granular substantial parts are connected either directly or via a muscular substantial part. Specific examples of the surface structure are shown in FIGS. 1 to 6. It is preferred in the present invention that the filtration downstream surface is a structure as shown in FIG. 3, 4, 5 or 6 and that the filtration upstream surface is a structure as shown in FIG. 1 or 2.

A liquid to be filtered is introduced from the upstream membrane surface to the inside of the membrane wall. In the porous hollow fiber membrane, it is characteristic that the upstream membrane surface is in a three-dimensional structure comprising a network structure or a fine particle aggregate structure and such a structure achieves an effect that the relatively big substances to be removed such as contaminant, suspended substance, aggregate, etc. contained in the liquid to be filtered are efficiently removed. Since such substances to be removed are removed by the three-dimensional structure, a sedimented layer is hardly formed on the membrane surface and it is possible to reduce the filtration rate decay. The liquid to be filtered passes the central region of the membrane and, finally, it is recovered as a filtrate on the filtration downstream surface. As a result of the fact that the filtration downstream surface is in a dot-shaped or slit-shaped pore structure, a screen removing effect in the final stage of the filtration is achieved and the very fine substance to be removed such as virus is able to be efficiently removed. It is likely that, due to the mechanism as such, the membrane structure of the present invention is suitable for the efficient removal of the virus and for the efficient transmission/recovery of the protein.

In the porous hollow fiber membrane of the present invention, the filtration upstream side may be on the lumen of the hollow fiber membrane or on the outer wall side of the hollow fiber membrane and, in view of durability against the pressure applied in conducting the filtration, it is preferred to use the lumen of the hollow fiber membrane as the filtration upstream side and to filter from the inner side to the outer side of the hollow fiber membrane.

Figure 7:
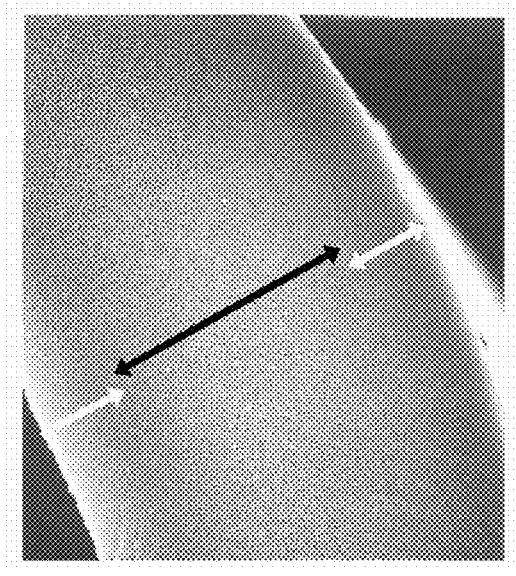
FIG. 7 is an example of the structure where the central area is substantially homogenous. The range shown by both arrows in the center of the image is "central region of membrane" while the ranges shown by both arrows on both sides are the in-plane side region and the out-plane side region of the membrane wall.
Figure 8:
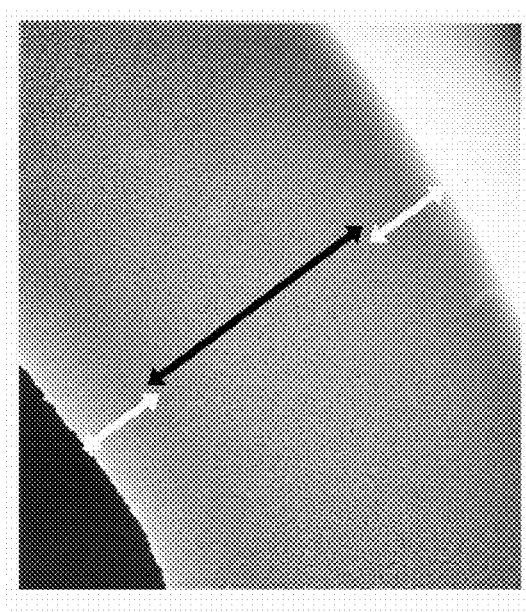
FIG. 8 is an example of the structure where the central area is substantially homogenous. The range shown by both arrows in the center of the image is "a central region of membrane" while the ranges shown by both arrows on both sides are the in-plane side region and the out-plane side region of the membrane wall.
Figure 9:
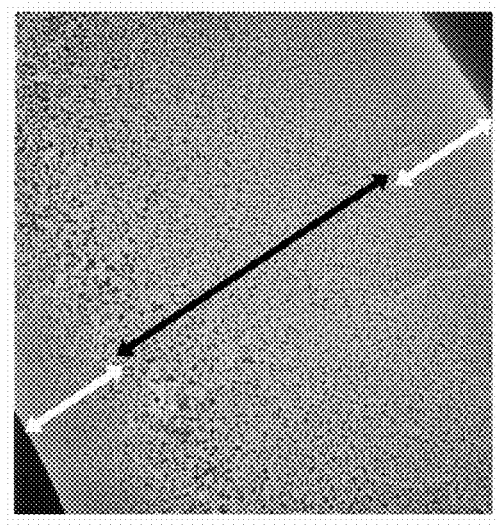
FIG. 9 is an example of the structure where the central region is not homogenous. The range shown by both arrows in the center of the image is "a central region of membrane" while the ranges shown by both arrows on both sides are the in-plane side region and the out-plane side region of the membrane wall.
Figure 10:
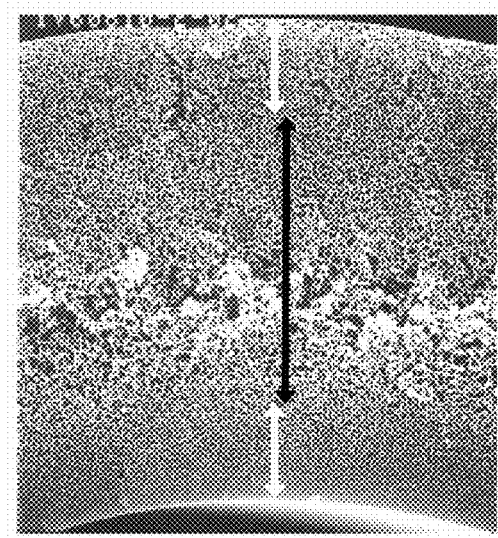
FIG. 10 is an example of the structure where the central region is not homogenous. The range shown by both arrows in the center of the image is "a central region of membrane" while the ranges shown by both arrows on both sides are the in-plane side region and the out-plane side region of the membrane wall.
Figure 11:
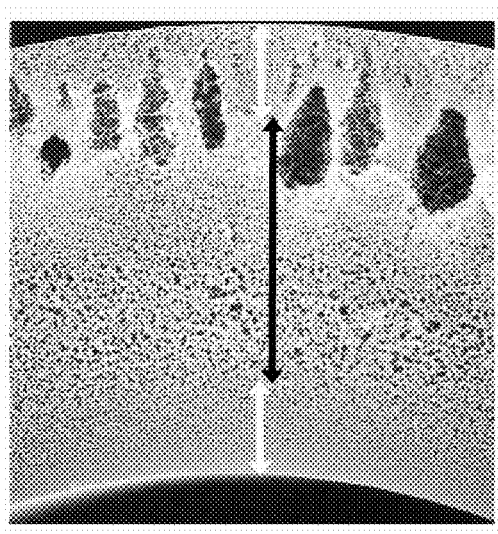
FIG. 11 is an example of the structure where the central region is not homogenous. The range shown by both arrows in the center of the image is "a central region of membrane" while the ranges shown by both arrows on both sides are the in-plane side region and the out-plane side region of the membrane wall.

In the porous hollow fiber membrane of the present invention, it is preferred that the central region of the membrane is composed of a substantially homogeneous structure and is also composed of a structure having substantially no macrovoids. "Central region of membrane" means a region between the position which is outer surface side from the inner surface in a distance corresponding to 20% of membrane thickness and the position which is inner surface side from the outer surface in a distance corresponding to 20% of membrane thickness and "substantially homogeneous structure" means that, when an SEM image in 1,000 magnifications is observed by naked eye, non-uniformity of the structure cannot be confirmed. To be more specific, the structure in FIGS. 7 and 8 is that which is meant by "the central region of the membrane is substantially homogeneous structure". In FIG. 9, the central region is in the order of rough-dense in the direction of from inside to outside; in FIG. 10, the central region is in the order of dense-rough-dense in the direction of from inside to outside; and, in FIG. 11, macrovoids are contained in the central region and, further, the rough-dense structure varies in a complicated manner. All of them are the structures which are not preferred in the present invention. Incidentally, in FIGS. 7 to 11, the range shown by both arrows in the center of the image is "the central region of membrane" and the ranges shown by both arrows on both sides are the inside region and the outside region of membrane wall.

The expression reading "having substantially no macrovoid" in the present invention means that, when SEM images (1,000 magnifications) by which five fields of the different regions of the membrane wall were taken are observed by naked eye, the pore region where the substantial part of the membrane is clearly deleted in a shape of circle, ellipse or liquid drop as compared with the homogeneous membrane wall or, in other word, the so-called macrovoid is not observed in any field.

It is preferred to utilize a homogeneous membrane in case virus is to be separated from a solution in which the things where the sizes are not extremely different are co-existing such as that the virus in a small size is to be separated and removed from a solution of immunoglobulin. That is because, when the homogeneous structure is applied in the thickness direction, an effect of pseudo-multistage can be expected such as that separation is repeatedly conducted in many layers. Moreover, as a result of utilization of such a structure, if and when a part of the membrane wall is deficient and trapping of the substance to be removed is not done at that place, there is a high possibility of stopping at any of the membrane wall whereby, as a whole membrane, risk of leak of the substance to be removed can be reduced. Due to the fact that the central region is in a homogeneous structure, the advantage as such can be achieved and it is suitable to remove the substance such as virus from a protein solution. Existence of macrovoid is not preferred since it makes the region by which such an effect can be expected narrow.

The porous hollow fiber membrane of the present invention is characterized in that its permeability for pure water (hereinafter, it will be abbreviated as pure water flux) is 10 to 300 L/(h·m²·bar) and its permeability for a 0.1% by weight bovine γ-globulin solution (hereinafter, it will be abbreviated as γG flux) is 30 to 100% of that for pure water. Incidentally, since the expression "γG flux is 30 to 100% of pure water flux" has the same meaning as "flux ratio is 30 to 100%" when the ratio of γG flux to pure water flux is defined as "flux ratio", such an expression may be sometimes adopted hereinafter. The pure water flux is an indication for showing the pore size of the porous membrane. When the pure water flux is smaller than the above value, the pore size becomes extremely small whereby it is difficult for efficiently transmitting the protein. Further, since the transmitted amount of water is small, the efficiency for recovering the filtrate lowers. When the pure water flux is more than the above value, the pore size becomes extremely big whereby it is difficult for efficiently separating and removing the substances to be removed such as virus. The pure water flux is preferred to be 40 to 200 L/(h·m²·bar) and more preferred to be 70 to 130 L/(h·m²·bar). Also, the flux ratio is preferred to be 60% or higher and more preferred to be 85% or higher.

It is preferred that the protein which is a component to be recovered in the filtrate shows a high transmission rate throughout the filtering process. Although it is difficult to unconditionally decide how much transmission rate is necessary in view of use, type, concentration, etc. of the protein, it is usually preferred to be 95% or more. When it is lower than 95%, loss of the protein by the filtration becomes big and the productivity lowers. In a membrane filtration, there is a possibility of a decrease in the transmission rate due to blocking when the filtering time becomes long. In view of the above, the transmission rate (rate of retaining the transmission rate) to the initial transmission rate at the filtering process at the stage when the filtration is conducted for a sufficiently long time is an index for showing the stability of the protein transmittance with elapse of time. Taking the fact that there is a possibility of lowering the transmission rate with elapse of time and that the transmission rate is preferred to be always 90% or more throughout the whole filtering process into consideration, the rate of retaining the transmission rate is preferred to be 95% or more. Here, although it is difficult to unconditionally decide the extent for "the stage when the filtration is conducted for a sufficiently long time" due to use, type, concentration, etc. of the protein, it will be rational to say that the stage is when a filtering load of at least one half of 50 L/m² or, in other words, about 25 L/m² is attained because, in a process for separating and removing the small-sized virus from a protein solution, it is usual that the maximum filtration load to the membrane is set at about 50 to 200 L/m². In addition, since it is the tendency in recent years that the concentration of the protein solution to be treated is becoming higher for a purpose of enhancing the productivity, it is rational to judge at the concentration of about 1% when the transmittance property of protein is to be considered. Thus, it is a preferred characteristic as a membrane to be used for the filtration of a protein solution that, in a 1% protein solution, the protein transmission rate is 95% or more and the rate for retaining the transmission rate at the stage of filtration load of about 25 L/m$^2$ is 95% or more.

According to the investigation of the present inventors, it has been found that the flux ratio can be adopted as an index for showing the stability of transmittance of protein with elapse of time. Thus, when the γG flux is lower than 30% of the pure water flux, a decrease with elapse of time is big even if the initial protein transmission rate is high whereby the retaining rate for the protein transmission rate lowers. It is usual that, in the bovine γ-globulin solution, the permeability lowers due to the presence of the bovine γ-globulin which is a solute. It is likely that the reason why γG flux is higher than 100% of the pure water flux is due to the deficiency in the membrane structure or to an extreme change in the structure as a result of contacting the protein and any of them is not practical. Although the details are ambiguous, it can predict the following mechanism. Thus, on the membrane surface, it is likely that membrane material and protein affect a delicate interaction each other. When the interaction between the membrane material and the protein is mild, adsorption/desorption of the protein with/from the membrane surface is reversible whereby the adsorption of the protein with the membrane surface can be neglected or is very little. The γG flux measured in such a membrane surface environment does not significantly lower as compared with the pure water flux measured in the absence of protein. Under such a state, resistance when the protein passes through the membrane can be suppressed to a sufficiently low extent whereby it is likely that the protein transmits in a highly efficient and stable manner. When the membrane material and the protein interact strongly, the coat layer may be layered irreversibly whereby it is likely that resistance to the transmission of protein becomes big and the protein transmission lowers. Incidentally, the γG flux in the present invention was determined under the following condition. Liquid temperature was adjusted to 25° C.

(1) A solution where bovine γ-globulin was dissolved in a phosphate-buffered physiological saline solution (hereinafter, it will be abbreviated as PBS) so as to make the concentration 0.1% by weight.

(2) This solution was introduced into a hollow fiber membrane in a dry state and primed by passing 1 L of the filtrate per m$^2$ of the membrane under a filtering pressure of 1.0 bar. The filtrate during the priming was discarded.

(3) After the priming treatment, filtration was conducted at the filtering pressure of 1.0 bar and the time necessary for obtaining 2.5 L of the filtrate per m$^2$ of the membrane area was measured.

(4) The γG flux was calculated from filtering pressure, membrane area, filtrate amount and time for the filtration.

The above-mentioned membrane surface where "the interaction of protein is mild" can specifically stand for a surface having such a characteristic that conformation of protein is hardly changed by contacting the protein and that the protein is hardly adsorbed therewith. Although it is difficult to unconditionally decide that in what state such a membrane surface will be and by what means it will be prepared, the fact that a sufficient hydrophilic property is given thereto will be one of the important causes. It is possible to prepare such a preferred membrane surface by a means where the existing amount and the existing state of the hydrophilic polymer are optimized which will be mentioned later.

The porous hollow fiber membrane of the present invention for the treatment of a protein-containing liquid is characterized in that a permeability for a 0.1% by weight solution of bovine γ-globulin in 20 mmol/L phosphate buffer (hereinafter, it will be abbreviated as γG/20 mM-PB flux) is 30 to 100% of a permeability for a 0.1% by weight solution of bovine γ-globulin in a phosphate-buffered physiological saline solution (hereinafter, it will be abbreviated as γG/PBS flux). Incidentally, since the expression "γG/20 mM-PB flux is 30 to 100% of γG/PBS flux" has the same meaning as "flux ratio is 30 to 100%" when the ratio of γG/20 mM-PB flux to γG/PBS flux is defined as "flux ratio", such an expression may be sometimes adopted hereinafter. According to the investigation of the present inventors, it has been found that the flux ratio can be an index showing the stability of the protein transmittance with elapse of time. Thus, when the γG/20 mM-PB flux is lower than 30% of the γG/PBS flux, the decrease with elapse of time is big even if the protein transmission rate in the initial stage is high whereby the retaining rate for the protein transmission rate lowers. Generally, there is a tendency that protein such as globulin is apt to aggregate when the ionic strength of a solution is low and it is usual that a membrane permeability for a solution having low ionic strength is lower than the membrane permeability for a solution having high ionic strength. It is likely that the reason why γG/20 mM-PB flux is more than 100% of γG/PBS flux is due to the deficiency in the membrane structure or to an extreme change in the structure as a result of contacting the protein solution having a low ionic strength and any of them is not practical.

Although the details of the mechanism where the stable protein transmission is achieved with elapse of time when the above flux ratio is high are ambiguous, the following mechanism will be predicted. Thus, on the membrane surface, it is likely that there is a delicate interaction (a kind of reversible adsorption/desorption) between a membrane material and protein each other. At that time, the ion contained in the protein solution has an action of tearing off the protein from the membrane surface (an effect of inclining the balance between adsorption and desorption to the desorption side). Accordingly, there is a tendency that the stronger the ionic strength of the protein solution, the more suppressive the interaction between the membrane material and the protein. When the above is mentioned in other way, it is likely that, in the membrane material and the membrane surface where the interaction is made low even upon contacting the protein solution having a low ionic strength, the interaction with protein is light and has a high compatibility. Thus, it is likely that, in the membrane where the ratio of γG/20 mM-PB flux measured under the low ionic strength condition to γG/PBS flux measured under the high ionic strength condition is in a high value, the interaction to protein is light and the resistance when the protein passes through the membrane is well suppressed to low whereby the protein can transmit in high efficiency and stability.

Incidentally, the expression reading "20 mmol/L phosphate buffer" (hereinafter, it will be abbreviated as 20 mM-PB) in the present invention means a buffer where the total concentration of phosphoric acid ($PO_4^{3-}$) salt and/or hydrogen phosphoric acid ($HPO_4^{2-}$) salt and/or dihydrogen phosphoric acid ($H_2PO^{-4}$) salt and/or free phosphoric acid ($H_3PO_4$) is 20 mmol/L and its pH is preferred to be from 6.0 to 8.0. The term reading "phosphate-buffer physiological saline solution" (hereinafter, it will be abbreviated as PBS) in the present invention means an isotonic aqueous physiological saline solution to which a buffer action is given by a phosphate and its pH is preferred to be from 6.5 to 7.5. The γG/PBS flux and γG/20 mM-PB flux in the present invention were measured according to the following measuring condition. Liquid temperature was adjusted to 25° C.

(1) A solution where bovine γ-globulin was dissolved in the prescribed buffer solution so as to make the concentration 0.1% by weight.

(2) This solution was introduced into a hollow fiber membrane in a dry state and primed by passing 20 L of the filtrate per m² of the membrane under a filtering pressure of 1.0 bar. The filtrate during the priming was discarded.

(3) After the priming treatment, filtration was conducted at the filtering pressure of 1.0 bar and the time necessary for obtaining 2.0 L of the filtrate per m² of the membrane area was measured.

(4) The permeability was calculated from filtering pressure, membrane area, filtrate amount and time for the filtration.

Inner diameter of the porous hollow fiber membrane for the treatment of a protein-containing liquid according to the present invention is preferred to be 100 to 1,000 more preferred to be 150 to 800 more preferred to be 200 to 400 μm, and more preferred to be 250 to 300 μm. Also, the membrane thickness is preferred to be 10 to 500 μm, more preferred to be 20 to 400 μm, more preferred to be 50 to 200 μm, and more preferred to be 80 to 100 μm. When the inner diameter is smaller than the above ranges, there may be the case where the loss of pressure by passing the liquid becomes big and the filtering pressure becomes non-uniform in the longitudinal direction of the hollow fiber membrane if the filtration is conducted from inside to outside. When a liquid to be treated containing much impurities and coagulating components is introduced, there is a possibility that blocking of the lumen is resulted due to the components in the liquid to be treated. When the inner diameter is larger than the above ranges, crushing, torsion, etc. of the hollow fiber membrane are apt to happen. When the membrane thickness is smaller than the above ranges, crushing, torsion, etc. of the hollow fiber membrane are apt to happen. When the membrane thickness is large than the above ranges, it may happen that the resistance when the liquid to be treated passes the membrane wall become large and the transmitting property lowers.

It is preferred that the porous hollow fiber membrane of the present invention contains hydrophobic polymer and hydrophilic polymer and examples of the hydrophobic polymer include polyester, polycarbonate, polyurethane, polyamide, polysulfone (hereinafter, it will be abbreviated as PSf), polyether sulfone (hereinafter, it will be abbreviated as PES), poly(methyl methacrylate), polypropylene, polyethylene and PVDF. Among them, polysulfone-based polymers such as PSf and PES having the repeating unit represented by the following [Formula 1] and [Formula 2] are advantageous for preparing a membrane having a high water transmitting property and is preferred. The polysulfone-based polymers mentioned hereinabove may contain a substituent such as functional group and alkyl group and the hydrogen atom of the hydrocarbon backbone may be substituted with other atom or substituents such as halogen. They may be used either solely or by mixing two or more.

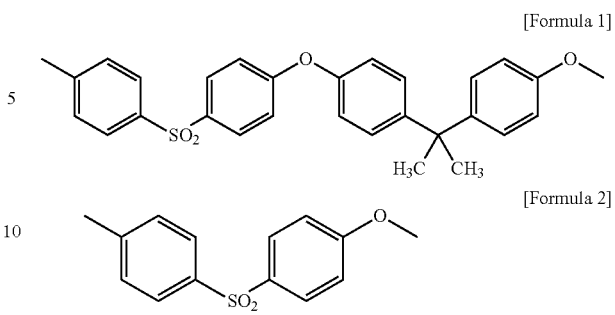

With regard to the hydrophilic polymer in the present invention, there may be exemplified polyethylene glycol, poly(vinyl alcohol), polyvinylpyrrolidone (hereinafter, it will be abbreviated as PVP), and macromolecular carbohydrate such as carboxymethyl cellulose and starch. Among them, PVP is preferred in view of its miscibility with a polysulfone-based polymers and its actual result in use as a membrane for the treatment of an aqueous fluid. Each of them may be used solely or two or more may be used as a mixture. The PVP having a weight-average molecular weight of 10,000 to 1,500,000 can be preferably used. To be more specific, the PVP being available from BASF in a molecular weight of 9,000 (K17) is preferred and then those of 45,000 (K30), 450,000 (K60), 900,000 (K80, and 1,200,000 (K90) are preferably used.

There is no particular limitation at all for the method of manufacturing the macromolecular porous hollow fiber membrane of the present invention and an example thereof is a method where hydrophobic polymer, hydrophilic polymer, solvent and non-solvent are dissolved by mixing, foams are removed therefrom, the resulting one is used as a membrane-preparing solution together with a core liquid and is discharged from the ring-shaped part and from the central part of a tube-in-orifice nozzle at the same time and then it is introduced into a coagulating bath via an air gap part to form a hollow fiber membrane (a wet-and-dry spinning method) followed by washing with water, winding and drying.

With regard to a solvent used for the membrane-preparing solution, wide varieties thereof may be used so far as it is a good solvent for the hydrophobic polymer and the hydrophilic solvent such as, for example, N-methyl-2-pyrrolidone (hereinafter, it will be abbreviated as NMP), N,N-dimethylformamide (hereinafter, it will be abbreviated as DMF), N,N-dimethylacetamide (hereinafter, it will be abbreviated as DMAc), dimethyl sulfoxide (hereinafter, it will be abbreviated as DMSO) and ε-caprolactam. When polysulfone-based polymers such as PSf or PES are used as a hydrophobic polymer, an amide-type aprotic solvent such as NMP, DMF or DMAc is preferred and NMP is particularly preferred. The amide-type solvent in the present invention means a solvent containing an amide bond of N—C(═O) in its structure and the aprotic solvent means a solvent containing no hydrogen atom directly bonding to a hetero atom other than carbon atom in its structure.

It is preferred to add a non-solvent for polymers to the membrane-preparing solution. Examples of the usable non-solvent include ethylene glycol (hereinafter, it will be abbreviated as EG), propylene glycol (hereinafter, it will be abbreviated as PG), diethylene glycol (hereinafter, it will be abbreviated as DEG), triethylene glycol (hereinafter, it will be abbreviated as TEG), polyethylene glycol (hereinafter, it will be abbreviated as PEG), glycerol and water and, when polysulfone-based polymers such as PSf or PES are used as a hydrophobic polymer and PVP is used as a hydrophilic polymer, an ether polyol such as DEG, TEG or PEG is preferred and TEG is particularly preferred. In the present invention, the ether polyol means a substance having at least one ether bond and two or more hydroxyl groups in its structure.

Although the detailed mechanism therefor is ambiguous, it is likely that, when a membrane-preparing solution prepared using the solvent and non-solvent as such is used, a phase separation (coagulation) in a spinning step is suppressed and it is advantageous to form the preferred membrane structure of the present invention. In controlling the phase separation, the compositions of the core liquid and of the liquid in the coagulating bath which will be mentioned later are also important.

The ratio of the solvent to the non-solvent in a membrane-preparing solution is an important factor for the control of the phase separation (coagulation) in a spinning step. It is preferred that the non-solvent is in the same amount as or in somewhat excessive amount to the solvent and, to be more specific, the ratio by weight of solvent/non-solvent is preferred to be from 25/75 to 50/50, more preferred to be from 30/70 to 50/50, and more preferred to be from 35/65 to 50/50. When the amount of the solvent is less than that, coagulation is apt to proceed and the membrane structure becomes too tight whereby the transmittance property lowers. When the amount of the solvent is more than that, progress of the phase separation is excessively suppressed, pores in large diameter are apt to be generated and there is a possibility of resulting in the lowering of separation characteristics and strength. That is not preferred.

Although there is no particular limitation for the concentration of the hydrophobic polymer in the membrane-preparing solution so far as the preparation of the membrane from the solution is possible, it is preferred to be 10 to 40% by weight, more preferred to be 10 to 30% by weight, and more preferred to be 15 to 25% by weight. In order to achieve a high transmitting property, the concentration of the hydrophobic polymer is preferred to be low but, when it is extremely low, there is a possibility of resulting in lowering of the strength and deterioration of the separating characteristics whereby it is preferred to be 15 to 25% by weight. Although there is no particular limitation for the adding amount of the hydrophilic polymer so far as it is an amount sufficient for giving hydrophilicity to the hollow fiber membrane and for suppressing the non-specific adsorption upon filtering the solution to be treated without causing the disadvantages for preparing the membrane from the membrane-preparing solution, it is preferred to be 2 to 15% by weight, more preferred to be 2 to 10% by weight, and more preferred to be 3 to 8% by weight in terms of the concentration of the hydrophilic polymer in the membrane-preparing solution. When the adding amount of the hydrophilic polymer is less than that, there is a possibility that the hydrophilicity is insufficiently given to the membrane whereby the retaining property of the membrane characteristics lowers. When it is more than that, an effect of giving the hydrophilicity is saturated whereby the efficiency is not good. In addition, the phase separation (coagulation) of the membrane-preparing solution is apt to excessively proceed whereby the operation ability becomes bad and, moreover, it is disadvantageous for forming the preferred membrane structure of the present invention.

The membrane-preparing solution can be obtained by mixing of hydrophobic polymer, hydrophilic polymer, solvent and non-solvent followed by stirring and dissolving. When appropriate temperature is applied at that time, dissolving can be efficiently done but, since an excessive heating has a risk of causing the degradation of the polymer, it is preferred to be 30 to 100° C. and more preferred to be 40 to 80° C. When PVP is used as a hydrophilic polymer, preparation of the membrane-preparing solution is preferred to be conducted together with filling the inert gas since PVP tends to result in oxidative degradation affected by oxygen in the air. Examples of the inert gas include nitrogen and argon and the use of nitrogen is preferred. At that time, it is preferred that the residual oxygen concentration in a dissolving tank is 3% or less.

In preparing the membrane, it is preferred to use a membrane-preparing solution wherefrom foreign matters are excluded therefrom so that generation of defect in the membrane structure due to contamination of foreign substances in the hollow fiber membrane is avoided. To be more specific, it is effective that, for example, a method where a material containing little foreign substances is used and that the membrane-preparing solution is filtered to decrease the foreign substances. In the present invention, it is preferred that a membrane-preparing solution is filtered through a filter having smaller pores than the membrane thickness of the hollow fiber membrane and then extruded from a nozzle. To be more specific, a uniformly dissolved membrane-preparing solution is passed through a sintered filter having a pore size of 10 to 50 µm installed during the passage from the dissolving tank to the nozzle. Although the filtering treatment may be conducted at least once, it is preferred in view of the filtering efficiency and of extending the filter life that, when the filtering treatment is conducted in plural steps, the pore size of a filter is made smaller in the latter stages. Pore size of the filter is more preferably 10 to 45 µm and more preferably 10 to 40 µm. When the filter pore size is too small, it may happen that the back pressure rises and the productivity lowers.

Removal of foams from the membrane-preparing solution is effective for obtaining a hollow fiber membrane having no defect. As a method for suppressing the contamination of foams, it is effective to defoam the membrane-preparing solution. Although it depends upon the viscosity of the membrane-preparing solution, defoaming upon being allowed to stand or defoaming in vacuo may be used therefor. In that case, the inner area of the dissolving tank is vacuated from "atmospheric pressure—100 mmHg" to "atmospheric pressure—750 mmHg" and then the tank is tightly closed followed by being allowed to stand for 30 to 180 minutes. This operation is repeated for several times to conduct the defoaming treatment. When the vacuated degree is too low, long time may be needed for the treatment since the numbers of the defoaming should be increased. When the vacuated degree is too high, the cost for rising the tightly closing degree of the system may become high. It is preferred that the total treating time is from 5 minutes to 5 hours. When the treating time is too long, the components constituting the membrane-preparing solution may be decomposed and deteriorated due to the affection of the low pressure. When the treating time is too short, the effect of defoaming may be insufficient.

With regard to the composition of the core liquid used in the preparation of the hollow fiber membrane, it is preferred to use a liquid where the solvent and/or the non-solvent contained in the membrane-preparing solution are/is the main component(s). However, in case where only a solvent is contained in the membrane-preparing solution, coagulation on the lumen wall surface is excessively suppressed whereby it is unable to give a preferred surface structure. Accordingly, it is preferred to use any of a mixed liquid of solvent and non-solvent, non-solvent only, a mixed liquid of solvent and water, a mixed liquid of non-solvent and water and a mixed liquid of solvent, non-solvent and water. The amount of the organic component contained in the core liquid is preferred to be 50 to 100% by weight and more preferred to be 60 to 100% by weight. To be more specific, it is preferred that, in case the core liquid is a mixed liquid of solvent and water, the amount of the organic component is made 50 to 65% by weight; in case the core liquid is a mixed liquid of non-solvent and water, the amount of the organic component is made 60 to 100% by weight; and, in case the core liquid is a mixed liquid of solvent, non-solvent and water, it is preferred to be made the same as the ratio of solvent/non-solvent of the membrane-preparing solution followed by diluting with water whereupon the concentration of the organic component is made 60 to 95% by weight. When the amount of the organic component is less than that, coagulation is apt to proceed and the membrane structure becomes too tight whereupon the transmitting property lowers. When the amount of the organic component is more than that, progress of the phase separation is excessively suppressed and pores in large diameter are apt to be generated whereupon there is an increasing possibility of causing the lowering in the separation characteristics and the strength.

It is preferred that the composition of the outer coagulating liquid uses a mixed liquid of water with the solvent and non-solvent contained in a membrane-preparing solution. At that time, the rate of the solvent to the non-solvent contained in the core liquid is preferably same as the rate of solvent/non-solvent in the membrane-preparing solution. Preferably, the solvent and non-solvent which are the same as those used for the membrane-preparing solution are mixed in the same rate as that in the membrane-preparing solution and water is added thereto to dilute. Amount of water in the outer coagulating liquid is 20 to 70% by weight and preferably 30 to 60% by weight. When the amount of water is more than that, coagulation is apt to proceed and the membrane structure becomes tight whereupon the transmitting property lowers. When the amount of water is less than that, progress of the phase separation is excessively suppressed and pores in large diameter are apt to be formed whereupon there is a high possibility of resulting in the lowering of separation characteristic and strength. When temperature of the outer coagulating liquid is low, coagulation is apt to proceed and the membrane structure becomes too tight whereupon the transmitting property may lower. When it is high, progress of phase separation is excessively suppressed and pores in large diameter are apt to be formed whereupon there is a high possibility of resulting in the lowering of separation characteristic and strength. Accordingly, the temperature is 40 to 70° C. and preferably 45 to 65° C.

One of the factors for controlling the membrane structure in the present invention is the nozzle temperature. When the nozzle temperature is low, coagulation is apt to proceed and the membrane structure becomes too tight whereby the transmitting property lowers. When it is high, progress of the phase separation is excessively suppressed and pores in large diameter are apt to be formed whereupon there is a high possibility of resulting in the lowering of separation characteristic and strength. Accordingly, it is 30 to 85° C. and preferably 40 to 75° C.

An example of the preferred manufacturing method for obtaining the macromolecular porous hollow fiber membrane of the present invention is a wet-and-dry spinning method where a membrane-preparing solution extruded from a tube-in-orifice nozzle together with a core liquid is introduced, via an air gap part, into a coagulating bath filled with an outer coagulating liquid to form a hollow fiber membrane and the retention time of the membrane-preparing solution extruded from the nozzle in the air gap part can be one of the factors for controlling the membrane structure. When the retention time is short, quenching by the outer coagulating liquid is resulted under the state where the growth of the coagulated particles is suppressed by the phase separation in the air gap part whereby the outer surface becomes tight and the transmitting property lowers. Moreover, there is a tendency that the resulting hollow fiber membrane is apt to be strongly adhered due to the tightening of the outer surface and that is not preferred. When the retention time is long, pores in large diameter are apt to be formed and there is a high possibility of causing the lowering of separation characteristic and strength. Preferred range of the retention time in the air gap is 0.01 to 2 second(s) and more preferably 0.05 to 1 second.

The above-mentioned hollow fiber membrane which is introduced into a coagulating bath via the air gap part where the retention time is relatively short contacts, together with the progress of coagulation from the core liquid, the outer coagulating liquid in such a state that the coagulation from outside is suppressed to some extent. During course of passing through the outer coagulating liquid, coagulation of the hollow fiber membrane completely finishes and the structure is determined followed by being drawn up. The retention time in the coagulating bath is important for controlling the membrane structure and, to be more specific, it is preferred to be 1 to 20 second(s) and more preferred to be 4 to 15 seconds. When the retention time in the coagulating bath is shorter than that, coagulation is insufficient while, when it is longer than that, it is necessary to lower the membrane-preparing speed and to make the size of the coagulating bath large whereby both of them are not preferred. When two coagulating baths filled with the outer coagulating solutions in the same composition and the same temperature are prepared and the hollow fiber membrane introduced into the first coagulating bath is once drawn up followed by dipping in the outer coagulating liquid of the second coagulating bath, a hollow fiber membrane having preferred separating characteristic and membrane structure can be prepared. At that time, it is preferred that the ratio of the retention time in the first coagulating bath to the retention time in the second coagulating bath is made from 2:8 to 5:5 where the retention time in the second coagulating bath is a bit longer. Although the detailed mechanism is ambiguous, there is a possibility that a delicate change in the tension at the time of drawing up and re-dipping of the hollow fiber membrane during the course of passing through the outer coagulating liquid and also a delicate change in the coagulating environment due to contacting the air layer during the course of passing the outer coagulating bath result in a favorable influence thereon. In order to give such a delicate change hysteresis in the coagulating bath, the retention time of the hollow fiber membrane between the first and the second coagulating baths is preferred to be 1 to 15 second(s) and more preferred to be 4 to 10 seconds. It is also preferred that, between the first and the second coagulating baths, the hollow fiber membrane is changed in its running direction using two or more rollers rotating at the same speed and then introduced into the second coagulating bath. As a result of conducting as such, the hollow fiber membrane somewhat shrinks together with being minutely dried running in the air and, since its speed is controlled by the rollers in the same speed, a delicate change in the tension is now resulted.

In order to manufacture the porous hollow fiber membrane of the present invention, it is necessary to delicately control the progress of coagulation from both inner and outer surfaces and the careful point therefor at that time is the bending of the hollow fiber membrane in the coagulating bath. In a wet-and-dry spinning, it is common that a membrane-preparing solution is extruded in a gravity direction from the nozzles which are usually aligned downward and introduced into a coagulating bath via an air gap part an, in the coagulating bath, its direction of movement is changed to upward followed by pulling up from the coagulating bath, washing in a water washing bath and being wound. Since the macromolecular porous hollow fiber membrane of the present invention is in a state where the structure is not completely decided immediately after coming into the coagulating bath, defect and destruction of the membrane structure may be resulted if the change in the direction in the coagulating bath is too quickly conducted. To be more specific, a method where a multiple-point guide is used and the direction is gradually changed at the plural points is preferred.

Although there is no particular limitation for the membrane-preparing velocity (spinning speed) so far as a hollow fiber membrane without defect is obtained and the productivity is ensured, it is preferably 5 to 40 m/minute and more preferably 10 to 30 m/minute. When the spinning speed is lower than that, the productivity may lower. When the spinning speed is higher than that, it is difficult to secure the above-mentioned spinning conditions or, particularly, the retention time at the air gap part and the retention time in the coagulating bath.

The porous hollow fiber membrane of the present invention is in such a constitution that the filtration downstream surface has dot-shaped or slit-shaped pores, that the filtration upstream surface comprises a network structure or a fine particle aggregate structure, that the central region of the membrane comprises a substantially homogeneous structure and that the membrane wall comprises a structure having substantially no macrovoids. In order to achieve such a characteristic structure, it is important that, as mentioned already, preferred membrane-preparing solution composition, core liquid composition, outer coagulating bath composition, various temperature control, retention time, etc. are combined so that the membrane-preparing condition is optimized.

The hollow fiber membrane is obtained via a washing step after preparing the membrane. Although there is no particular restriction for the method of washing the hollow fiber membrane, it is preferred in view of washing effect, safety and simplicity that the prepared hollow fiber membrane is just made to run in a washing bath filled with warm water online and then wound. Temperature of the warm water used at that time is preferably from room temperature to 100° C. and more preferably from 30 to 90° C. When the temperature is lower than that, there is a high possibility that a washing effect is not sufficient while, when it is higher than that, water may not be used as a washing liquid.

In the hollow fiber membrane obtained via the washing after preparation, it is preferred to subject to a heating treatment for a purpose of suppressing the membrane characteristic during the use and by an washing operation and also of securing the retaining/stabilizing property of the membrane characteristics and the recovering property of the membrane characteristics. When the heating treatment is conducted by means of dipping into a hot water, the effect of washing and removing the solvent and the non-solvent being remained in the hollow fiber membrane can also be expected. In obtaining the porous hollow fiber membrane of the present invention, it is a preferred means that, prior to this dipping operation into hot water, the aging is conducted for a while in such a state where the core liquid is contacted the lumen of the hollow fiber. As a result of applying the aging as such, it is likely that the amount and the existing state of the hydrophilic polymer in the membrane are optimized whereby pure water flux, γG flux, γG/20 mM-PB flux and γG/PBS flux are optimized. It is preferred that concentration of the core liquid in this step is 10 to 60% by weight in terms of the concentration of the organic component, that the temperature is 15 to 30° C. and that the time is 10 to 180 minutes. When the concentration of the organic component is lower than that, the temperature is lower than that and the time is shorter than that, then the excessive hydrophilic polymer is apt to be remained and there is a high possibility of resulting in the inconveniences such as changes in the membrane characteristics with elapse of time and the contamination of the liquid to be treated due to elution in actual use. When the concentration of the organic component is higher than that, the temperature is higher than that and the time is longer than that, there is then a high possibility of resulting in the lowering of separating characteristics and strength due to the destruction of the surface structure of the lumen and the excessive extraction of the hydrophilic polymer.

In conducting the above-mentioned aging, although the hollow fiber membrane wherefrom the organic component is completely removed may be dipped again in an aqueous solution of solvent/non-solvent, it is rather simple and easy that the core liquid composition at the stage of preparing the membrane is subjected to fine adjustment or the washing condition in online is adjusted whereby the concentration of the organic component in the core liquid is made the above preferred range followed by just aging at and for the above preferred temperature and time. Although the preferred composition of the core liquid is mentioned already, it is preferred to consider in the composition in such a view that the concentration of the organic component contained in the core liquid after spinning is also within the above-mentioned range of 10 to 60% by weight. With regard to the online washing conditions, the temperature is particularly preferred to be 30 to 90° C. as mentioned already and the retention time of the hollow fiber membrane in the water washing bath is preferred to be 5 to 100 seconds. To be more specific and for example, when the core liquid was a mixture of NMP, TEG and water (their composition ratio by weight=38.25: 46.75:15), then the temperature at the online washing with water was 55° C., the retention time was 11 seconds and the concentration of the organic component in the core liquid in the lumen of the resulting hollow fiber membrane was 35% by weight.

The temperature of hot water used for the heating treatment of the hollow fiber membrane after the above aging is 40 to 100° C., more preferably 60 to 95° C. and the treating time therefor is 30 to 90 minutes, more preferably 40 to 80 minutes and more preferably 50 to 70 minutes. When the temperature is lower than that and the treating time is shorter than that, there is a possibility that the thermal hysteresis applied to the hollow fiber membrane is insufficient whereupon the retaining property and the stability of the membrane characteristics lower and that the washing effect is insufficient whereupon the eluted things increase. When the temperature is higher than that and the treating time is longer than that, water may boil or long time may be needed for the treatment whereby the productivity may lower. Although there is no particular limitation for the bath ratio of the hollow fiber membrane to hot water so far as there is used the hot water of an amount in which the hollow fiber membrane is sufficiently dipped. However, the use of too much water results in a possibility of lowering the productivity. When the hollow fiber membrane is made into bundles of appropriate length followed by dipping into hot water in a upright state during this heating treatment, the hot water is apt to reach the part of the lumen and that is preferred in view of the heating treatment and the washing effect.

It is preferred that the porous hollow fiber membrane of the present invention is treated with hot water of high pressure immediately after the above heating treatment. To be more specific, it is preferred to set in a high-pressure steam sterilizing device in a state of being dipped in water and to treat under the conventional high-pressure steam sterilizing condition which is the treating temperature at 120 to 134° C. and the treating time for 20 to 120 minutes. At that time, it is preferred that the above hollow fiber membrane where the heating treatment finishes is promptly subjected to the treatment with high-pressure hot water just in the wet state and just in the high-temperature state. Although the detailed mechanism therefor is ambiguous, temperature of the membrane rises by the heating treatment and the treatment with water of high-pressure is further conducted under such a "loosened" state whereby it is likely that the excessive hydrophilic polymer is removed and, at the same time, the existing state is optimized whereupon pure water flux, γG flux, γG/20 mM-PB flux and γG/PBS flux are optimized. When the treating temperature is lower than the above range or the treating time is shorter than that, the treating condition is too mild whereupon the removal of the excessive hydrophilic polymer and the optimization of the existing state are insufficient and, as a result, there is a high possibility of causing the inconveniences such as changes in the membrane characteristics with elapse of time and contamination of the liquid to be treated due to elution in actual use. When the treating temperature is higher than the above range or the treating time is longer than that, the treating condition is severe whereupon there is a high possibility of lowering the separation characteristics and the strength due to the destruction of the membrane structure and also to the excessive extraction of the hydrophilic polymer.

In addition to the above heating treatment and high-pressure hot-water treatment, the porous hollow fiber membrane for the treatment of a protein-containing solution according to the present invention may be further irradiated with radiant ray in a state of being moistened with or dipped in water. It is likely that, as a result of such a treatment, a part of the hydrophilic polymer is cross-linked and, at the same time, its existing state is optimized and pure water flux, γg/20 mM-PB flux and γG/PBS flux are optimized. As to the radiant ray, there may be utilized, for example, α ray, β ray, γ ray, X ray, ultraviolet ray and electron beam and, in view of the actual results in a sterilizing treatment and also of the easiness of dose control, γ ray is preferred. Dose of the radiant ray is preferred to be 5 to 100 kGy and more preferred to be 10 to 50 kGy. When the dose is less than that, the effect of the radiant ray irradiation is insufficient while, when it is more than that, there is a possibility of causing an excessive cross-linking of the hydrophilic polymer or deterioration of the material. An additive may be added to the water for making it moistened or dipped therein in the radiant ray irradiation. A substance having an antioxidant effect or a radical trapping effect such as sulfite or polyhydric alcohol is preferred as the additive. It is also preferred that the water for moistening or dipping is deaerated to remove the dissolved oxygen or that an inert gas is sealed into the inner area of a container or packing material in which the membrane to be subjected to the radiant ray irradiation is sealed. As a result of such a treatment, there are expected the effect where production of excessive active species derived from the radiant ray irradiation is prevented and the species are removed resulting in the optimization of the cross-linked degree and existing state of the hydrophilic polymer and also the effect where the deterioration or the like of the material is avoided. Although the adding amount varies depending upon the type of the additive, it is 0.01 to 1%, and preferably 0.01 to 0.1% in the case of sulfite, and 0.1 to 40%, and preferably 1 to 20% in the case of polyhydric alcohol. There is a possibility that, when the amount is less than that, an excessive cross-linking of the hydrophilic polymer and deterioration of the material are resulted and, when the amount is more than that, an excessive inhibition of the effect by the radiant ray irradiation is resulted.

When the hollow fiber membrane where membrane preparation, heating treatment, high-pressure hot-water treatment and radiant ray irradiation finish is dried, it is finally completed. As to a method for drying, a commonly used means such as drying with air, drying in vacuo or hot-wind drying can be widely utilized. Although a microwave drying which has been utilized recently for drying, etc. of the membrane for the treatment of blood is also utilizable, a hot-wind drying is preferably used in such as view that large amount of hollow fiber membrane can be efficiently dried using a simple device. When the above heating treatment is applied before drying, changes in the membrane characteristics due to the hot-wind drying can also be suppressed. Although there is no particular limitation for the temperature of hot wind in the case of the hot-wind drying, it is preferably 40 to 100° C. and more preferably 50 to 80° C. When the temperature is lower than that, long time is needed until being dried while, when it is higher than that, energy cost for generating the hot wind becomes high whereby any of them is not favorable. Temperature of the hot wind is preferred to be lower than the temperature in the above heating treatment with hot water.

EXAMPLES

Efficacy of the present invention will now be illustrated by way of the following Examples although the present invention is not limited thereto. Incidentally, methods for the evaluation in the following Examples are as shown below.

1. Preparation of Mini-Module

Hollow fiber membrane was cut into the size of about 30 cm and both ends thereof were bundled by a paraffin film to prepare a hollow fiber membrane bundle. Both ends of this hollow fiber membrane bundle was inserted into a pipe (sleeve) and solidified using a urethane potting agent. The ends were cut to give a both-end-open mini-module where both ends were fixed with the sleeves. Numbers of the hollow fiber membrane were appropriately set so as to make the surface area of the inside 30 to 50 cm$^2$.

2. Preparation of Mini-Module Equipped with the Outer Shell

A cylindrical chip and another cylindrical chip having a side port were attached on an end of the tube (about 15 cm length) made of poly(vinyl chloride) and on another end thereof, respectively. One to five hollow fiber membrane(s) cut into the size of about 15 cm was/were inserted into the above tube made of poly(vinyl chloride) equipped with the chips in both ends and then the chip parts on both ends were covered with a silicone adhesive in such a manner that the lumen of the hollow fiber membrane were not clogged. When liquid is introduced from the chip part of the end to the lumen of the hollow fiber membrane in this mini-module equipped with the outer shell, it is possible to filter in the direction of from the lumen of the hollow fiber membrane to the outer surface (filtration from inside to outside) and, when liquid is introduced from the side port, it is also possible to filter in the direction of from the outer wall to the lumen (filtration from outside to inside).

3. Calculation of the Membrane Area

Membrane area of the module was determined on the basis of the diameter of the inside of the hollow fiber membrane. The membrane area A [m$^2$] can be calculated by the following formula [1].

$$A = n \times \pi \times d \times L \quad [1]$$

In the formula, n is numbers of the hollow fiber membrane, π is ratio of the circumference of a circle to its diameter, d is inner diameter [m] of the hollow fiber membrane and L is an effective length [m] of the hollow fiber membrane in the module.

4. Measurement of the Pure Water Flux

A circuit was connected to two terminal sleeves (each of them will be referred to as inlet for lumen and outlet for lumen) of the mini-module so that the flow-in pressure of the liquid into the mini-module and the flow-out pressure of the liquid from the mini-module could be measured. Pure water was placed in a pressure tank, kept at 25° C. and introduced into the inlet for lumen of the mini-module together with adjusting the filtering pressure to about 1.0 bar using a regulator so as to fill the pure water in the lumen of the hollow fiber membrane. The circuit (downstream side from the point for measuring the pressure) connected to the outlet for lumen was blocked with a forceps to stop the flow so that the pure water flown thereinto from the inlet for lumen of the module was entirely filtered. Pure water was continuously sent to the mini-module, filtration was carried out for 30 seconds and priming of the membrane was conducted. The filtrate during the priming treatment was discarded. After that, the amount of the filtrate obtained from the outside of the hollow fiber membrane was recovered within two minutes and its amount was measured. Further, the pressure Pi at the inlet for lumen and the pressure Po at the outlet for lumen during the filtration were measured and the difference in the pressure between the membranes (TMP) ΔP was calculated by the following formula [2]

$$\Delta P = (Pi + Po)/2 \quad [2]$$

The pure water flux [L/(h·m$^2$·bar)] was calculated by the following formula [3] from filtering time t [h], TMP ΔP [bar], membrane area of the mini-module A [m$^2$] and amount of the filtrate V [L].

$$\text{Pure water flux} = V/t/A/\Delta P \quad [3]$$

5. Measurement of γG Flux

Dulbecco PBS(−) powder "Nissui" (9.6 g) commercially available from Nissui Seiyaku was dissolved in distilled water to make the total volume 1,000 mL whereupon PBS was prepared. γ-Globulin from bovine blood (Product No. G5009) commercially available from Sigma Aldrich Japan was dissolved in the above buffer so as to make 0.1% by weight whereupon a 0.1% by weight solution of bovine γ-globulin was prepared. This 0.1% by weight solution of bovine γ-globulin was used for measuring the γG flux by the same method as in the above for the measurement of pure water flux.

6. Measurement of Transmission Rate of the Immunoglobulin

A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Flow-in pressure of the liquid was made to be able to be measured at the liquid inlet side. The liquid outlet side was blocked with a forceps to stop the flow so that all of the liquid flown thereinto from the inlet opening for the lumen of the module could be filtered. Kenketsu Glovenin I Nichiyaku commercially available from Takeda Pharmaceutical Company Limited was dissolved in a dissolving liquid attached thereto to make the concentration 5% and this was diluted with PBS to an extent of ten times whereupon a 0.5% human immunoglobulin preparation solution for intravenous injection (hereinafter, it will be abbreviated as IVIG) was prepared. A 0.5% IVIG was placed in a pressure tank, kept at 25° C. and introduced into the lumen of the mini-module equipped with an outer shell together with controlling the pressure using a regulator so as to make the filtering pressure 1.0 bar. The filtrate obtained from the outside of the hollow fiber membrane was recovered from the side port of the chip. The filtrate was received by changing a container whenever 2 L of the filtrate per m$^2$ of the outer surface of the hollow fiber membrane was obtained (every 2 L/m$^2$ of the loaded amount of the filtrate). Transmission rate of the immunoglobulin was calculated by the formula of "100[%]×(protein concentration in the filtrate)/(protein concentration in the liquid to be filtered)". Here, with regard to the concentrations in the liquid to be filtered and in the filtrate, the absorbance at 280 nm was measured and the concentrations were calculated from a calibration curve prepared from an immunoglobulin solution of known concentration.

7. Measurement of γG/20 mM-PB Flux

Potassium dihydrogen phosphate commercially available from Wako Pure Chemicals was dissolved in distilled water to prepare a 20 mmol/L solution. Dipotassium hydrogen phosphate commercially available from Wako Pure Chemicals was dissolved in distilled water to prepare a 20 mmol/L solution. Aqueous solutions of potassium dihydrogen phosphate (28 parts by volume) and dipotassium hydrogen phosphate (72 parts by volume) were mixed to prepare a 20 mM-PB. γ-Globulin from bovine blood (Product No. G5009) commercially available from Sigma Aldrich Japan was dissolved in the above buffer so as to make it 0.1% by weight whereupon a 0.1% by weight solution of bovine γ-globulin in a 20 mmol/L phosphate buffer (hereinafter, it will be abbreviated as γG/20 mM-PB) was prepared. A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Flow-in pressure of the liquid was made to be able to be measured at the liquid inlet side. The liquid outlet side was blocked with a forceps to stop the flow so that all of the liquid flown thereinto from the inlet opening for the lumen of the module was able to be filtered. γG/20 mM-PB was placed in a pressure tank, kept at 25° C. and introduced into the lumen of the mini-module equipped with an outer shell together with controlling the pressure using a regulator so as to make the filtering pressure 1.0 bar. The filtrate obtained from the outside of the hollow fiber membrane was recovered from the side port of the chip. γG/20 mM-PB was provided until a filtrate of 20 L per m$^2$ of the hollow fiber membrane was obtained so that the membrane was primed. The filtrate obtained during this period was discarded. After completion of the priming, γG/20 mM-PB was successively provided with a filtering pressure of 1.0 bar and the time needed for obtaining a filtrate of 2.0 L per m² of the membrane area was measured. γG/20 mM-PB flux was calculated by the above formula [3] from filtering pressure, membrane area, filtrate amount and time needed for filtration.

8. γG/PBS Flux

Dulbecco PBS(−) powder "Nissui" (9.6 g) commercially available from Nissui Seiyaku was dissolved in distilled water to make the total volume 1,000 mL whereupon PBS was prepared. γ-Globulin from bovine blood (Product No. G5009) commercially available from Sigma Aldrich Japan was dissolved in the above buffer so as to make 0.1% by weight whereupon a 0.1% by weight solution of bovine γ-globulin.PBS (hereinafter, it will be abbreviated as γG/PBS) was prepared. This γG/PBS was used for measuring the γG/PBS flux by the same method as in the above for the measurement of γG/20 mM-PB flux.

9. Measurement of Transmission Rate and Permeability of the Immunoglobulin for Intravenous Injection A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Flow-in pressure of the liquid was made to be able to be measured at the liquid inlet side. The liquid outlet side was blocked with a forceps to stop the flow so that all of the liquid flown thereinto from the inlet opening for the lumen of the module was able to be filtered. Kenketsu Glovenin I Nichiyaku commercially available from Takeda Pharmaceutical Company Limited was dissolved in a dissolving liquid attached thereto to make the concentration 5% and this was diluted with PBS to an extent of five times whereupon a 1.0% human immunoglobulin preparation solution for intravenous injection (hereinafter, it will be abbreviated as IVIG) was prepared. A 1.0% IVIG was placed in a pressure tank, kept at 25° C. and introduced into the lumen of the mini-module equipped with an outer shell together with controlling the pressure using a regulator so as to make the filtering pressure 1.0 bar. The filtrate obtained from the outside of the hollow fiber membrane was recovered from the side port of the chip. The filtrate was received by changing a container whenever 2 L of the filtrate per m² of the outer surface of the hollow fiber membrane was obtained (every 2 L/m² of the loaded amount of the filtrate). Transmission rate of the immunoglobulin was calculated by the formula of "100 [%]×(protein concentration in the filtrate)/(protein concentration in the liquid to be filtered)". Here, with regard to the concentrations in the liquid to be filtered and in the filtrate, the absorbance at 280 nm was measured and the concentrations were calculated from a calibration curve prepared from an immunoglobulin solution of known concentration. Also, permeability of IVIG (hereinafter, it will be abbreviated as IVIG flux) was calculated by the above formula [3] from filtering pressure, membrane area, filtrate amount and time needed for filtration at the time of sampling of each fraction.

10. Measurement of Clearance Index for a Bacteriophage øX174

(1) Preparation of a Phage Liquid for the Test

Albumin from bovine serum (Product No. A2153) commercially available from Sigma Aldrich Japan was dissolved in PBS prepared by the already-mentioned method so as to make the concentration 0.1% by weight whereupon a 0.1% by weight solution of BSA (hereinafter, it will be just called a BSA solution) was obtained. A freeze-stored and concentrated liquid containing øX 174 (titer: 1 to 10×10⁹ pfu/mL) was thawed and diluted to an extent of 100 times using the BSA solution. It was further filtered through a membrane filter of 0.1 μm pore size to remove the coagulated component, etc. and used as a phage liquid for the test.

(2) Filtering Test Using the Phage Liquid for the Test

A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Flow-in pressure of the liquid was made to be able to be measured at the liquid inlet side. The liquid outlet side was blocked with a forceps to stop the flow so that all of the liquid flown thereinto from the inlet opening for the lumen of the module was able to be filtered. The phage liquid for the test was placed in a pressure tank, kept at 25° C. and introduced into the lumen of the mini-module equipped with an outer shell together with controlling the pressure using a regulator so as to make the filtering pressure 1.0 bar. The filtrate obtained from the outside of the hollow fiber membrane was recovered from the side port of the chip. Filtration was conducted until 50 L of the filtrate per m² of the outer surface of the hollow fiber membrane was obtained.

(3) Measurement of the Phage Liquid for the Test and the Phage Titer of the Filtrate

*Escherichia coli* was suspended in a 10M aqueous MgSO₄ solution so that the absorbance at 660 nm was made 4.0 (hereinafter, it will be called as *E. coli* liquid). Further, agar medium and top agar were prepared and warmed at 50° C. Particularly for top agar, careful attention was paid for keeping its fluidity. A liquid (10 μL) where the phage liquid for the test was appropriately diluted was mixed with the 50 μL of the *E. coli* liquid followed by incubating at 37° C. for 20 minutes whereupon *E. coli* was infected by the phage. After completion of the incubation, all of the mixed liquid was mixed with 3 mL of top agar and the whole amount was developed onto an agar medium. After the top agar was completely solidified on the agar medium, incubation was conducted at 37° C. for 2 to 4 hours. After completion of the incubation, the plaque numbers on the agar medium were counted and, taking the diluting rate into consideration, the titer of the phase liquid for the test (hereinafter, it will be abbreviated as Tpre) [pfu/ml] was calculated. Phage titer of the filtrate (hereinafter, it will be abbreviated as Tpost) was also obtained by the same means.

(4) Calculation of Phage Clearance Index of the Hollow Fiber Membrane

A phage clearance index of the hollow fiber membrane was calculated by the following formula [4]. In the formula, Tpre [pfu/mL] means the titer of the phage liquid for the test introduced into the hollow fiber membrane for the evaluation and Tpost [pfu/mL] means the titer of the filtrate obtained by filtering the phage liquid for the test through a hollow fiber membrane for the test.

$$\text{Phage clearance index[LRV]}=\log_{10}(T\text{pre}/T\text{post}) \quad [4]$$

The present invention 1 will now be illustrated by way of the specific examples as hereunder.

Example 1

PES (Sumika Excel (registered trade mark) 4800P manufactured by Sumitomo Chemtech)) (20.0 parts by weight), 5.5 parts by weight of PVP manufactured by BASF (Collidon (registered trade mark) K90), 33.53 parts by weight of NMP manufactured by Mitsubishi Chemical and 40.97 parts by weight of TEG manufactured by Mitsui Chemical were mixed at 60° C. during 3 hours to dissolve whereupon a uniform solution was prepared. This was further subjected to pressure reduction at 60° C. to atmospheric pressure minus 700 mmHg and, after that, the inner system was immediately sealed tightly so that the solution composition did not change due to evaporation of the solvent, etc. followed by being allowed to stand for 4 hours to defoam and the resulting solution was used as a solution for preparing the membrane. This membrane-preparing solution was extruded from the ring-shaped part of the tube-in-orifice nozzle while TEG was extruded from the central part thereof as core liquid and they were introduced, via an air gap of 20 mm, into a coagulating bath filled with an outer coagulating liquid comprising 27 parts by weight of NMP, 33 parts by weight of TEG and 40 parts by weight of RO water. At that time, temperature of the nozzle was set at 66° C. while temperature of the outer coagulating liquid was set at 46° C. Two coagulating baths of the first coagulating bath and the second coagulating bath were prepared and, in the first coagulating bath, the hollow fiber membrane was pulled out therefrom by gradually changing the direction of movement of the hollow fiber membrane using three rod-shaped guides of 12 mm diameter. After that, the hollow fiber membrane was subjected to a running in air of 2,000 mm by changing the running direction using three rollers and then introduced into the second coagulating bath. The hollow fiber membrane was further made to run in the second coagulating bath, pulled out from the second coagulating bath, made to run in the washing tub to conduct the online washing and wound using a winding machine.

Spinning velocity was 18 m/minute, dipped depth of the hollow fiber membrane in the first coagulating bath was 200 mm in terms of the deepest area from the liquid surface, running distance of the hollow fiber membrane in the first coagulating bath was 800 mm and the running distance of the hollow fiber membrane in the second coagulating bath was 1,200 mm. Extruding amounts of the membrane-preparing solution and the core liquid were controlled so as to make the inner diameter and the membrane thickness of the hollow fiber membrane about 280 μm and about 80 μm, respectively. Retention time in the air gap part, retention time in the first coagulating bath, that in the second coagulating bath, total retention time in both coagulating baths and retention time for the running in air between the first and the second coagulating baths of the hollow fiber membrane calculated from the above-mentioned conditions were 0.067 second, 2.67 seconds, 4 seconds, 6.67 seconds and 6.67 seconds, respectively. Warm water of 55° C. was filled in the washing tub and the running length was set so as to make the retention time of the hollow fiber membrane in the washing tub 11 seconds.

The wound hollow fiber membrane was made into a bundle comprising 800 membranes of 35 cm length and subjected to a heating treatment by dipping into RO water of 90° C. for 60 minutes under the upright state. Time from the initiation of the winding until the heating treatment via making into a bundle was made 10 to 90 minutes. The winding machine was placed in an environment set at 20° C. and the treating temperature from its winding until it was made into a bundle was made 20° C. Concentration of the organic component contained in the lumen of the wound hollow fiber membrane was 26% by weight. Thus, the hollow fiber membrane was subjected to aging at 20° C. for 10 to 90 minutes under the state of contacting the core liquid where the organic component concentration was 26% by weight.

The hollow fiber membrane where the heating treatment finished was promptly dipped, in its wet state, into warm water of 40° C. filled in a high-pressure steam sterilizing device and subjected to a high-pressure hot-water treatment under the condition of 132° C. for 20 minutes. After that, drying with hot air was conducted at 50° C. for 10 hours to give a hollow fiber membrane (A) where inner diameter was 287 μm and membrane thickness was 75 μm. According to the observation under an SEM, the hollow fiber membrane (A) has such a constitution that the outer wall surface (the filtration downstream surface in case the filtration was conducted from inside to outside) had a dot-shaped pores, the lumen surface (the filtration upstream surface in case the filtration was conducted from inside to outside) was in a fine particle aggregate structure, the central region of the membrane was in a substantially homogeneous structure and the membrane wall was in a substantially macrovoid-free structure. Pure water flux and γG flux of the hollow fiber membrane (A) were measured by the already-mentioned method and the flux ratio was calculated from the above flux values. Those characteristics and properties of the hollow fiber membranes (A) are shown together in Table 1.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Hollow fiber membrane | (A) | (B) | (C) | (D) | (E) | (F) | (G) | (B) |
| Inner diameter (μm) | 287 | 274 | 271 | 282 | 284 | 280 | 279 | 274 |
| Membrane thickness (μm) | 75 | 86 | 119 | 84 | 116 | 144 | 125 | 86 |
| Filtration downstream surface | Outer wall surface Dot-shaped pores | Outer wall surface Dot-shaped pores | Outer wall surface Dot-shaped pores | Outer wall surface Dot-shaped pores | Outer wall surface Dot-shaped pores | Outer wall surface Dot-shaped pores | Outer wall surface Dot-shaped pores | Lumen surface Network structure |
| Filtration upstream surface | Lumen surface Fine particle aggregate structure | Lumen surface Network structure | Lumen surface Fine particle aggregate structure | Lumen surface Fine particle aggregate structure | Lumen surface Slit-shaped pores | Lumen surface Dot-shaped pores | Lumen surface Network structure | Outer wall surface Dot-shaped pores |
| Central region of membrane | Substantially homogeneous structure | Substantially homogeneous structure | Substantially homogeneous structure | Substantially homogeneous structure | Coexistence of sparse part and dense part | Coexistence of sparse part and dense part | Substantially homogeneous structure | Substantially homogeneous structure |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Macrovoids | Substantially macrovoid-free | Substantially macrovoid-free | Substantially macrovoid-free | Substantially macrovoid-free | Substantially macrovoid-free | Substantially macrovoid-free | Substantially macrovoid-free | Substantially macrovoid-free |
| Pure water flux (L/h/m²/bar) | 74 | 121 | 115 | 108 | 1043 | 650 | 326 |  |
| γG flux (L/h/m²/bar) | 69 | 117 | 100 | 96 | 264 | 247 | 286 |  |
| Flux ratio (%) | 93 | 97 | 87 | 89 | 25 | 38 | 88 |  |

Transmission rate of immunoglobulin (IVIG transmission rate) in the hollow fiber membrane (A) was measured by the already-mentioned method. The IVIG transmission rate at the stages where the filtration load amounts were 2 L/m², 6 L/m², 16 L/m² and 24 L/m² were determined and the "retention rates of IVIG transmission rate" were calculated from the following formula and used as an index for the stability of the IVIG transmission rate with elapse of time.

Retention rate of IVIG transmission rate [%]=100× (IVIG transmission rate at the stage where filtration load amount was 24 L/m)/(IVIG transmission rate at the stage where filtration load amount was 2 L/m²)

A clearance index for a bacteriophage øX174 (hereinafter, it will be abbreviated as øX174 clearance) of the hollow fiber membrane (A) was measured by the already-mentioned method. IVIG transmission rate, retention rate for IVIG transmission rate and øX174 clearance were shown together in Table 2 as the protein-transmitting ability and bacteriophage-removing properties of the hollow fiber membrane.

γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Example 3

The same operations as in Example 1 were conducted except that the constitution of the membrane-preparing solution was made 20.0 parts by weight of PES (4800P), 6.0 parts by weight of PVP (K30), 33.3 parts by weight of NMP and 40.7 parts by weight of TEG, and that the temperatures of the nozzle and the outer coagulating bath were changed to 66° C. and 40° C., respectively whereby the extruded amounts of the membrane-preparing solution and the core liquid were controlled so as to make the inner diameter and the membrane thickness about 280 μm and about 120 μm, respectively to give a hollow fiber membrane (C) in which

TABLE 2

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Hollow fiber membrane |  | (A) | (B) | (C) | (D) | (E) | (F) | (G) | (B) |
| IVIG transmission rate (%) | at 2 L/m² | 95.2 | 97.8 | 96.1 | 96.8 | 91.7 | 95.0 | 97.2 | 90.5 |
|  | at 6 L/m² | 95.6 | 96.9 | 94.9 | 96.8 | 82.9 | 95.1 | 97.7 | 88.8 |
|  | at 16 L/m² | 95.2 | 95.2 | 94.8 | 97.5 | 64.0 | 94.0 | 97.9 | 71.5 |
|  | at 24 L/m² | 95.0 | 98.7 | 95.0 | 95.3 | 54.0 | 94.9 | 98.1 | 57.1 |
| Retention rate of IVIG transmission rate (%) |  | 99.8 | 100 | 98.9 | 98.5 | 58.9 | 99.9 | 100 | 63.1 |
| øx174 clearance (LRV) |  | >5.1 | >5.1 | 4.1 | >5.1 | 0.12 | 0.22 | 0.26 | 4.1 |

Example 2

The same operations as in Example 1 were conducted except that the constitution of the membrane-preparing solution was made 20.0 parts by weight of PES (4800P), 6.0 parts by weight of PVP (K90), 33.3 parts by weight of NMP and 40.7 parts by weight of TEG, that the core liquid was a mixed liquid comprising 38.25 parts by weight of NMP, 46.75 parts by weight of TEG and 15 parts by weight of RO water and that the temperatures of the nozzle and the outer coagulating bath were changed to 56° C. and 55° C., respectively whereby the extruded amounts of the membrane-preparing solution and the core liquid were controlled so as to make the inner diameter and the membrane thickness about 280 μm and about 80 μm, respectively to give a hollow fiber membrane (B) in which the inner diameter and the membrane thickness were 274 μm and 86 μm, respectively. Incidentally, the organic component concentration in the core liquid contained in the lumen of the hollow fiber membrane (B) at the winding stage in the membrane-preparing process was 35% by weight. Observation under the SEM, measurement of water flux and measurement of the inner diameter and the membrane thickness were 271 μm and 119 μm, respectively. Incidentally, the organic component concentration in the core liquid contained in the lumen of the hollow fiber membrane (C) at the winding stage in the membrane-preparing process was 19% by weight. Observation under the SEM, measurement of water flux and measurement of γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Example 4

The same operations as in Example 1 were conducted except that the constitution of the membrane-preparing solution was made 20.0 parts by weight of PSf (manufactured by Amoco; P-3500), 6.0 parts by weight of PVP (K90), 33.3 parts by weight of NMP and 40.7 parts by weight of TEG, that the core liquid was a mixed liquid comprising 38.25 parts by weight of NMP, 46.75 parts by weight of TEG and 15 parts by weight of RO water and that the temperatures of the nozzle and the outer coagulating bath were changed to 55° C. and 54° C., respectively whereby the extruded amounts of the membrane-preparing solution and the core liquid were controlled so as to make the inner diameter and the membrane thickness about 280 μm and about 80 μm, respectively to give a hollow fiber membrane (D) in which the inner diameter and the membrane thickness were 282 μm and 84 μm, respectively. Incidentally, the organic component concentration in the core liquid contained in the lumen of the hollow fiber membrane (D) at the winding stage in the membrane-preparing process was 33% by weight. Observation under the SEM, measurement of water flux and measurement of γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Comparative Example 1

PES (4800P) (20.0 parts by weight), 1.0 part by weight of PVP (K90), 35.5 parts by weight of NMP and 43.45 parts by weight of TEG were dissolved by the same method as in Example 1 to give a membrane-preparing solution. This membrane-preparing solution and the core liquid (a mixed liquid comprising 36 parts by weight of NMP, 44 parts by weight of TEG and 20 parts by weight of RO water) were extruded from the ring-shaped part and the central part, respectively, of the tube-in-orifice nozzle and introduced, via an air gap of 20 mm, into a coagulating bath filled with an outer coagulating liquid comprising a mixture of 27 parts by weight of NMP, 33 parts by weight of TEG and 40 parts by weight of RO water. At that time, the nozzle temperature was set at 65° C. while the outer coagulating liquid temperature was set at 55° C. Two coagulating baths of the first and the second coagulating baths were prepared and, in the first coagulating bath, one rod-shaped guide of 12 mm diameter was pulled out by changing the moving direction of the hollow fiber membrane. After that, the hollow fiber membrane was subjected to a running in air of 2,000 mm by changing the running direction using three rollers and then introduced into the second coagulating bath. The hollow fiber membrane was further made to run in the second coagulating bath, pulled out from the second coagulating bath, made to run in the washing tub to conduct the online washing and wound using a winding machine.

Spinning velocity was 18 m/minute, dipped depth of the hollow fiber membrane in the first coagulating bath was 250 mm in terms of the deepest area from the liquid surface, running distance of the hollow fiber membrane in the first coagulating bath was 800 mm and the running distance of the hollow fiber membrane in the second coagulating bath was 1,200 mm. Extruding amounts of the membrane-preparing solution and the core liquid were controlled so as to make the inner diameter and the membrane thickness of the hollow fiber membrane about 280 μm and about 120 μm, respectively. Retention time in the air gap part, retention time in the first coagulating bath, that in the second coagulating bath, total retention time in both coagulating baths and retention time for the running in air between the first and the second coagulating baths of the hollow fiber membrane calculated from the above-mentioned conditions were 0.067 second, 2.67 seconds, 4 seconds, 6.67 seconds and 6.67 seconds, respectively. Warm water of 55° C. was filled in the washing tub and the running length was set so as to make the retention time of the hollow fiber membrane in the washing tub 75 seconds.

The wound hollow fiber membrane was made into a bundle comprising 800 membranes of 35 cm length and subjected to a heating treatment by dipping into RO water of 90° C. for 60 minutes under the upright state. Time from the initiation of the winding until the heating treatment via making into a bundle was made 10 to 90 minutes. The winding machine was placed in an environment set at 20° C. and the treating temperature from its winding until it was made into a bundle was made 20° C. Concentration of the organic component contained in the lumen of the wound hollow fiber membrane was 1.2% by weight. Thus, the hollow fiber membrane was subjected to aging at 20° C. for 10 to 90 minutes under the state of contacting the core liquid where the organic component concentration was 1.2% by weight.

Drying with hot air was conducted at 50° C. for 10 hours to the hollow fiber membrane where the heating treatment finished in order to give a hollow fiber membrane (E) where inner diameter was 284 μm and membrane thickness was 116 μm. Observation under the SEM, measurement of water flux and measurement of γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Comparative Example 2

The same operation as in Comparative Example 1 was carried out except that the constitution of the membrane-preparing solution was changed to 19.0 parts by weight of PES (4800P), 2.0 parts by weight of PVP (K90), 35.55 parts by weight of NMP and 43.45 parts by weight of TEG and that the extruded amounts of membrane-preparing solution and core liquid were controlled so that the inner diameter and the membrane thickness were made about 280 μm and about 140 μm, respectively whereupon a hollow fiber membrane (F) where the inner diameter was 80 μm and the membrane thickness was 144 μm were prepared. Incidentally, the organic component concentration in the core liquid contained in the lumen of the hollow fiber membrane (F) at the winding stage in the membrane-preparing process was 1.8% by weight. Observation under the SEM, measurement of water flux and measurement of γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Comparative Example 3

The same operation as in Comparative Example 1 was carried out except that the constitution of the membrane-preparing solution was changed to 20.0 parts by weight of PES (4800P), 3.0 parts by weight of PVP (K30), 34.65 parts by weight of NMP and 42.35 parts by weight of TEG, that the core liquid was a mixed liquid comprising 20 parts by weight of NMP and 80 parts by weight of TEG and that the temperatures of the nozzle and the outer coagulating bath were changed to 68° C. and 40° C., respectively whereby the extruded amounts of membrane-preparing solution and core liquid were controlled so that the inner diameter and the membrane thickness were made about 280 μm and about 120 μm, respectively whereupon a hollow fiber membrane (G) where the inner diameter was 279 μm and the membrane thickness was 125 μm were prepared. Incidentally, the organic component concentration in the core liquid contained in the lumen of the hollow fiber membrane (G) at the winding stage in the membrane-preparing process was 2.6% by weight. Observation under the SEM, measurement of water flux and measurement of γG flux were conducted in the same manner as in Example 1 to calculate the flux ratio. The result is shown in Table 1. Further, IVIG transmission rate, retention rate of IVIG transmission rate and øX174 clearance were measured/calculated in the same manner as in Example 1. The result is shown in Table 2.

Comparative Example 4

The hollow fiber membrane (B) prepared in Example 2 was used and filtered from outside to inside (from the outer wall surface to the lumen surface) whereupon IVIG transmission rate, retention rate of IVIG transmission rate and øX174 clearance were measured/calculated. The result is shown in Table 2.

As will be apparent from the result of IVIG transmission rate, retention rate of IVIG transmission rate and øX174 clearance, protein is efficiently transmitted, a decrease in the transmission rate thereof with elapse of time is small and a sufficient bacteriophage-removing efficiency is achieved at the same time in the porous hollow fiber membrane of the present invention. It is likely that the specific membrane structure, pure water flux value and flux ratio which are characteristic in the present invention contribute in the achievement of the excellent characteristics as such. On the other hand, any of the properties for protein transmission and bacteriophage removal is not sufficient in case any of the constituent features of the specific membrane structure, pure water flux value and flux ratio is not satisfied as will be apparent from the result of Comparative Examples.

The present invention 2 will now be illustrated byway of the specific examples as hereunder.

Example 5

PES (Sumika Excel (registered trade mark) 4800P manufactured by Sumitomo Chemtech)) (20.0 parts by weight), 6 parts by weight of PVP manufactured by BASF (Collidon (registered trade mark) K90), 33.3 parts by weight of NMP manufactured by Mitsubishi Chemical and 40.7 parts by weight of TEG manufactured by Mitsui Chemical were mixed at 50° C. during 3 hours to dissolve whereupon a uniform solution was prepared. This was further subjected to pressure reduction at 60° C. to atmospheric pressure minus 700 mmHg and, after that, the inner system was immediately sealed tightly so that the solution composition did not change due to evaporation of the solvent, etc. followed by being allowed to stand for 4 hours to defoam and the resulting solution was used as a solution for preparing the membrane. This membrane-preparing solution was extruded from the ring-shaped part of the tube-in-orifice nozzle while a mixed liquid of 38.25 parts by weight of NMP, 46.75 parts by weight of TEG and 15 parts by weight of RO water was extruded from the central part thereof as core liquid and they were introduced, via an air gap of 20 mm, into a coagulating bath filled with an outer coagulating liquid comprising 26.1 parts by weight of NMP, 31.9 parts by weight of TEG and 42 parts by weight of RO water. At that time, temperature of the nozzle was set at 55° C. while temperature of the outer coagulating liquid was set at 55° C. Two coagulating baths of the first coagulating bath and the second coagulating bath were prepared and, in the first coagulating bath, the hollow fiber membrane was pulled out therefrom by gradually changing the direction of movement of the hollow fiber membrane using three rod-shaped guides of 12 mm diameter. After that, the hollow fiber membrane was subjected to a running in air of 2,000 mm by changing the running direction using three rollers and then introduced into the second coagulating bath. The hollow fiber membrane was further made to run in the second coagulating bath, pulled out from the second coagulating bath, made to run in the washing tub to conduct the online washing and wound using a winding machine.

Spinning velocity was 18 m/minute, dipped depth of the hollow fiber membrane in the first coagulating bath was 200 mm in terms of the deepest area from the liquid surface, running distance of the hollow fiber membrane in the first coagulating bath was 800 mm and the running distance of the hollow fiber membrane in the second coagulating bath was 1,200 mm. Extruding amounts of the membrane-preparing solution and the core liquid were controlled so as to make the inner diameter and the membrane thickness of the hollow fiber membrane about 280 μm and about 80 μm, respectively. Retention time in the air gap part, retention time in the first coagulating bath, that in the second coagulating bath, total retention time in both coagulating baths and retention time for the running in air between the first and the second coagulating baths of the hollow fiber membrane calculated from the above-mentioned conditions were 0.067 second, 2.67 seconds, 4 seconds, 6.67 seconds and 6.67 seconds, respectively. Warm water of 55° C. was filled in the washing tub and the running length was set so as to make the retention time of the hollow fiber membrane in the washing tub 11 seconds.

The wound hollow fiber membrane was made into a bundle comprising 800 membranes of 35 cm length and subjected to a heating treatment by dipping into RO water of 85° C. for 60 minutes under the upright state. Time from the initiation of the winding until the heating treatment via making into a bundle was made 10 to 90 minutes. The winding machine was placed in an environment set at 20° C. and the treating temperature from its winding until it was made into a bundle was made 20° C. Concentration of the organic component contained in the lumen of the wound hollow fiber membrane was 37% by weight. Thus, the hollow fiber membrane was subjected to aging at 20° C. for 10 to 90 minutes under the state of contacting the core liquid where the organic component concentration was 37% by weight.

The hollow fiber membrane where the heating treatment finished was promptly dipped, in its wet state, into warm water of 40° C. filled in a high-pressure steam sterilizing device and subjected to a high-pressure hot-water treatment under the condition of 132° C. for 20 minutes. After that, drying with hot air was conducted at 50° C. for 10 hours. Aqueous solution of glucose (1% by weight) was prepared in an aluminum-laminated bag and the hollow fiber membrane bundle was sealed in a dipped state therein and irradiated with γ ray of 20 kGy. The hollow fiber membrane for which irradiation of γ ray completed was washed with water and subjected to a hot-air drying at 50° C. for 10 hours to give a hollow fiber membrane (H) where the inner diameter was 275 μm and the membrane thickness was 85 μm. According to the observation under an SEM (see paragraphs [0021] and [0024]), the hollow fiber membrane (H) has such a constitution that the outer wall surface (the filtration downstream surface in case the filtration was conducted from inside to outside) had a dot-shaped pores, the lumen surface (the filtration upstream surface in case the filtration was conducted from inside to outside) was in a network structure, the central region of the membrane was in a substantially homogeneous structure and the membrane wall was in a substantially macrovoid-free structure. Pure water flux, γG/20 mM-PB flux, γG/PBS flux of the hollow fiber membrane (H) were measured by the already-mentioned method and the flux ratio was calculated. Those characteristics and properties of the hollow fiber membranes (H) are shown together in Table 3.

tration load amount was 30 L/m)/(IVIG transmission rate at the stage where filtration load amount was 2 L/m$^2$)

Permeability of immunoglobulin (IVIG flux) in the hollow fiber membrane (H) was measured by the already-mentioned method. The IVIG flux at the stages where the filtration load amounts were 2 L/m$^2$, 20 L/m$^2$, 24 L/m$^2$, 28 L/m$^2$ and 30 L/m$^2$ were determined and the "retention rates of IVIG flux" were calculated from the following formula and used as an index for the stability of the IVIG flux with elapse of time.

TABLE 3

|  | Example 5 | Example 6 | Example 7 | Comparative Example 5 | Comparative Example 6 | Comparative Example 7 | Comparative Example 8 |
|---|---|---|---|---|---|---|---|
| Hollow fiber membrane | (H) | (I) | (J) | (K) | (L) | (M) | (H) |
| Inner diameter (μm) | 275 | 276 | 280 | 282 | 278 | 278 |  |
| Membrane thickness ((m) | 85 | 88 | 83 | 115 | 140 | 123 |  |
| Filtration downstream Surface | Outer wall surface Dot-shaped pores | Outer wall surface Dot-shaped pores | Outer wall surface Dot-shaped pores | Outer wall surface Dot-shaped pores | Outer wall surface Dot-shaped pores | Outer wall surface Dot-shaped pores | Lumen surface Network structure |
| Filtration upstream surface | Lumen surface Network structure | Lumen surface Network structure | Lumen surface Fine particle aggregate structure | Lumen surface Slit-shaped pores | Lumen surface Dot-shaped pores | Lumen surface Network structure | Outer wall surface Dot-shaped pores |
| Central region of membrane | Substantially homogeneous structure | Substantially homogeneous structure | Substantially homogeneous structure | Coexistence of sparse part and dense part | Coexistence of sparse part and dense part | Substantially homogeneous structure | Substantially homogeneous structure |
| Macrovoids | Substantially macrovoid-free | Substantially macrovoid-free | Substantially macrovoid-free | Substantially macrovoid-free | Substantially macrovoid-free | Substantially macrovoid-free | Substantially macrovoid-free |
| Pure water flux (L/h/m$^2$/bar) | 118 | 133 | 102 | 1024 | 637 | 319 |  |
| γG/20 mM-PB flux (L/h/m$^2$/bar) | 45 | 48 | 27 | 71 | 74 | 199 |  |
| γG/PBS flux (L/h/m$^2$/bar) | 64 | 77 | 52 | 252 | 205 | 237 |  |
| Flux ratio (%) | 70 | 62 | 52 | 28 | 36 | 44 |  |

Transmission rate of immunoglobulin (IVIG transmission rate) in the hollow fiber membrane (H) was measured by the already-mentioned method. The IVIG transmission rate at the stages where the filtration load amounts were 2 L/m$^2$, 20 L/m$^2$, 24 L/m$^2$, 28 L/m$^2$ and 30 L/m$^2$ were determined and the "retention rate of IVIG transmission rate" was calculated from the following formula and used as an index for the stability of the IVIG transmission rate with elapse of time.

Retention rate of IVIG transmission rate [%]=100× (IVIG transmission rate at the stage where fil- Retention rate of IVIG flux [%]=100×(IVIG flux at the stage where filtration load amount was 30 L/m$^2$)/(IVIG flux at the stage where filtration load amount was 2 L/m$^2$)

A clearance index for a bacteriophage øX174 of the hollow fiber membrane (H) (hereinafter, it will be abbreviated as øX174 clearance) was measured by the already-mentioned method. IVIG transmission rate, retention rate for IVIG transmission rate, IVIG flux, retention rate of IVIG flux and øX174 clearance were shown together in Table 4 as the protein-transmitting ability and bacteriophage-removing properties of the hollow fiber membrane.

TABLE 4

|  |  | Example 5 | Example 6 | Example 7 | Comparative Example 5 | Comparative Example 6 | Comparative Example 7 | Comparative Example 8 |
|---|---|---|---|---|---|---|---|---|
| Hollow fiber membrane |  | (H) | (I) | (J) | (K) | (L) | (M) | (H) |
| IVIG transmission rate (%) | at 2 L/m$^2$ | 99.3 | 99.7 | 96.2 | 92.0 | 96.0 | 97.2 | 91.4 |
|  | at 20 L/m$^2$ | 99.3 | 96.5 | 96.5 | 53.2 | 94.8 | 98.0 | 65.0 |
|  | at 24 L/m$^2$ | 98.9 | 99.0 | 97.4 | 48.1 | 95.8 | 98.1 | 57.9 |
|  | at 28 L/m$^2$ | 99.5 | 98.3 | 95.3 | 44.2 | 94.8 | 97.7 | 55.2 |
|  | at 30 L/m$^2$ | 97.8 | 98.9 | 95.5 | 41.3 | 95.2 | 97.5 | 54.1 |
| Retention rate of IVIG transmission rate (%) |  | 98.5 | 99.2 | 99.3 | 44.9 | 99.2 | 100 | 59.2 |
| IVIG flux (L/h/m$^2$/bar) | at 2 L/m$^2$ | 113 | 120 | 98 | 309 | 255 | 312 | 118 |
|  | at 20 L/m$^2$ | 50 | 52 | 41 | 92 | 116 | 232 | 44 |
|  | at 24 L/m$^2$ | 37 | 45 | 28 | 66 | 90 | 215 | 26 |

TABLE 4-continued

|  | Example 5 | Example 6 | Example 7 | Comparative Example 5 | Comparative Example 6 | Comparative Example 7 | Comparative Example 8 |
|---|---|---|---|---|---|---|---|
| at 28 L/m² | 30 | 39 | 23 | 44 | 78 | 203 | 20 |
| at 30 L/m² | 28 | 37 | 21 | 34 | 73 | 199 | 17 |
| Retention rate of IVIG flux (%) | 24.8 | 30.8 | 21.4 | 11.0 | 28.6 | 63.8 | 14.8 |
| øx174 clearance (LRV) | >5.0 | >5.0 | >5.0 | 0.10 | 0.20 | 0.24 | 4.0 |

Example 6

The same operations as in Example 1 were conducted except that the temperature of the nozzle, the length of the air gap and the temperature of the outer coagulating bath were changed to 57° C., 10 mm and 63° C., respectively whereby the extruded amounts of the membrane-preparing solution and the core liquid were controlled so as to make the inner diameter and the membrane thickness about 280 μm and about 80 μm, respectively to give a hollow fiber membrane (I) in which the inner diameter and the membrane thickness were 276 μm and 88 μm, respectively. Since the length of air gap was shortened, retention time in the air gap part became 0.033 second. Incidentally, the organic component concentration in the core liquid contained in the lumen of the hollow fiber membrane (I) at the winding stage in the membrane-preparing process was 33% by weight. Observation under the SEM, measurement of water flux, measurement of γG/20 mM-PB flux, and measurement of γG/PBS flux were conducted in the same manner as in Example 1 to calculate the flux ratio. The result is shown in Table 3. Further, IVIG transmission rate, retention rate of IVIG transmission rate, IVIG flux, retention rate of IVIG flux and øX174 clearance were measured/calculated in the same manner as in Example 1. The result is shown in Table 4.

Example 7

The same operations as in Example 1 were conducted except that the constitution of the membrane-preparing solution was made 20.0 parts by weight of PSf (manufactured by Amoco; P-3500), 6.0 parts by weight of PVP (K90), 33.3 parts by weight of NMP and 40.7 parts by weight of TEG, that the core liquid was a mixed liquid comprising 38.25 parts by weight of NMP, 46.75 parts by weight of TEG and 15 parts by weight of RO water and that the temperatures of the nozzle and the outer coagulating bath were changed to 56° C. and 55° C., respectively whereby the extruded amounts of the membrane-preparing solution and the core liquid were controlled so as to make the inner diameter and the membrane thickness about 280 μm and about 80 μm, respectively to give a hollow fiber membrane (J) in which the inner diameter and the membrane thickness were 280 μm and 83 μm, respectively. Incidentally, the organic component concentration in the core liquid contained in the lumen of the hollow fiber membrane (J) at the winding stage in the membrane-preparing process was 32% by weight. Observation under the SEM, measurement of water flux, measurement of γG/20 mM-PB flux, and measurement of γG/PBS flux were conducted in the same manner as in Example 1 to calculate the flux ratio. The result is shown in Table 3. Further, IVIG transmission rate, retention rate of IVIG transmission rate, IVIG flux, retention rate of IVIG flux and øX174 clearance were measured/calculated in the same manner as in Example 1. The result is shown in Table 4.

Comparative Example 5

PES (4800P) (20.0 parts by weight), 1.0 part by weight of PVP (K90), 35.55 parts by weight of NMP and 43.45 parts by weight of TEG were dissolved in the same method as in the Example 1 whereupon a membrane-preparing solution was prepared. This membrane-preparing solution was extruded from the ring-shaped part of the tube-in-orifice nozzle while mixture liquid comprising 36 parts by weight of NMP, 44 parts by weight of TEG and 20 parts by weight of RO water were extruded from the central part thereof as core liquid and they were introduced, via an air gap of 20 mm, into a coagulating bath filled with an outer coagulating liquid comprising 26.1 parts by weight of NMP, 31.9 parts by weight of TEG and 42 parts by weight of RO water. At that time, temperature of the nozzle was set at 65° C. while temperature of the outer coagulating liquid was set at 55° C. Two coagulating baths of the first coagulating bath and the second coagulating bath were prepared and, in the first coagulating bath, the hollow fiber membrane was pulled out therefrom by gradually changing the direction of movement of the hollow fiber membrane using a rod-shaped guide of 12 mm diameter. After that, the hollow fiber membrane was subjected to a running in air of 2,000 mm by changing the running direction using three rollers and then introduced into the second coagulating bath. The hollow fiber membrane was further made to run in the second coagulating bath, pulled out from the second coagulating bath, made to run in the washing tub to conduct the online washing and wound using a winding machine.

Spinning velocity was 18 m/minute, dipped depth of the hollow fiber membrane in the first coagulating bath was 250 mm in terms of the deepest area from the liquid surface, running distance of the hollow fiber membrane in the first coagulating bath was 800 mm and the running distance of the hollow fiber membrane in the second coagulating bath was 1,200 mm. Extruding amounts of the membrane-preparing solution and the core liquid were controlled so as to make the inner diameter and the membrane thickness of the hollow fiber membrane about 280 μm and about 120 μm, respectively. Retention time in the air gap part, retention time in the first coagulating bath, that in the second coagulating bath, total retention time in both coagulating baths and retention time for the running in air between the first and the second coagulating baths of the hollow fiber membrane calculated from the above-mentioned conditions were 0.067 second, 2.67 seconds, 4 seconds, 6.67 seconds and 6.67 seconds, respectively. Warm water of 55° C. was filled in the washing tub and the running length was set so as to make the retention time of the hollow fiber membrane in the washing tub 75 seconds.

The wound hollow fiber membrane was made into a bundle comprising 800 membranes of 35 cm length and subjected to a heating treatment by dipping into RO water of 85° C. for 60 minutes under the upright state. Time from the initiation of the winding until the heating treatment via making into a bundle was made 10 to 90 minutes. The winding machine was placed in an environment set at 20° C. and the treating temperature from its winding until it was made into a bundle was made 20° C. Concentration of the organic component contained in the lumen of the wound hollow fiber membrane was 1.3% by weight. Thus, the hollow fiber membrane was subjected to aging at 20° C. for 10 to 90 minutes under the state of contacting the core liquid where the organic component concentration was 1.3% by weight.

The hollow fiber membrane where the heating treatment finished was promptly dipped, in its wet state, into warm water of 40° C. filled in a high-pressure steam sterilizing device and subjected to a high-pressure hot-water treatment under the condition of 132° C. for 20 minutes. After that, drying with hot wind was conducted at 50° C. for 10 hours to give a hollow fiber membrane (K) where inner diameter was 282 μm and membrane thickness was 115 μm. Observation under the SEM, measurement of water flux, measurement of γG/20 mM-PB flux, and γG/PBS flux were conducted in the same manner as in Example 1 to calculate the flux ratio. The result is shown in Table 3. Further, IVIG transmission rate, retention rate of IVIG transmission rate, IVIG flux, retention rate of IVIG flux, and øX174 clearance were measured/calculated in the same manner as in Example 1. The result is shown in Table 4.

Comparative Example 6

The same operations as in Comparative Example 1 were conducted except that the constitution of the membrane-preparing solution was made 19.0 parts by weight of PES (4800P), 2.0 parts by weight of PVP (K90), 35.55 parts by weight of NMP and 43.45 parts by weight of TEG, that the extruded amounts of the membrane-preparing solution and the core liquid were controlled so as to make the inner diameter and the membrane thickness about 280 μm and about 140 μm, respectively to give a hollow fiber membrane (L) in which the inner diameter and the membrane thickness were 278 μm and 140 μm, respectively. Incidentally, the organic component concentration in the core liquid contained in the lumen of the hollow fiber membrane (L) at the winding stage in the membrane-preparing process was 1.6% by weight. Observation under the SEM, measurement of water flux, measurement of γG/20 mM-PB flux, and measurement of γG/PBS flux were conducted in the same manner as in Example 1 to calculate the flux ratio. The result is shown in Table 3. Further, IVIG transmission rate, retention rate of IVIG transmission rate, IVIG flux, retention rate of IVIG flux and øX174 clearance were measured/calculated in the same manner as in Example 1. The result is shown in Table 4.

Comparative Example 7

The same operations as in Comparative Example 1 were conducted except that the constitution of the membrane-preparing solution was made 20.0 parts by weight of PES (4800P), 3.0 parts by weight of PVP (K30), 34.65 parts by weight of NMP and 42.35 parts by weight of TEG, that the core liquid was a mixed liquid comprising 20 parts by weight of NMP and 80 parts by weight of TEG and that the temperatures of the nozzle and the outer coagulating bath were changed to 68° C. and 40° C., respectively whereby the extruded amounts of the membrane-preparing solution and the core liquid were controlled so as to make the inner diameter and the membrane thickness about 280 μm and about 120 μm, respectively to give a hollow fiber membrane (M) in which the inner diameter and the membrane thickness were 278 μm and 123 μm, respectively. Incidentally, the organic component concentration in the core liquid contained in the lumen of the hollow fiber membrane (M) at the winding stage in the membrane-preparing process was 2.5% by weight. Observation under the SEM, measurement of water flux, measurement of γG/20 mM-PB flux, and measurement of γG/PBS flux were conducted in the same manner as in Example 1 to calculate the flux ratio. The result is shown in Table 3. Further, IVIG transmission rate, retention rate of IVIG transmission rate, IVIG flux, retention rate of IVIG flux and øX174 clearance were measured/calculated in the same manner as in Example 1. The result is shown in Table 4.

Comparative Example 8

The hollow fiber membrane (H) prepared in Example 1 was used and filtered from outside to inside (from the outer wall surface to the lumen surface) whereupon IVIG transmission rate, retention rate of IVIG transmission rate, IVIG flux, retention rate of IVIG flux and øX174 clearance were measured/calculated. The result is shown in Table 4.

As will be apparent from the result of IVIG transmission rate, retention rate of IVIG transmission rate, IVIG flux, retention rate of IVIG flux and øX174 clearance, protein is efficiently permeated, a decrease in the transmission rate and flux thereof with elapse of time is small and a sufficient bacteriophage-removing efficiency is achieved at the same time in the porous hollow fiber membrane for the treatment of a protein-containing liquid of the present invention. It is likely that the specific membrane structure, pure water flux value and flux ratio which are characteristic in the present invention contribute in the achievement of the excellent characteristics as such. On the other hand, any of the properties for protein transmission and bacteriophage removal is not sufficient in case any of the constituent features of the specific membrane structure, pure water flux value and flux ratio is not satisfied as will be apparent from the result of Comparative Examples.

Industrial Applicability

The porous hollow fiber membrane of the present invention has such advantages that it can efficiently separate and remove the substances to be removed such as small-particle virus contained in a solution and, at the same time, useful recovering substances such as protein can be efficiently permeated and the decreases of their transmission rate and the permeability of the solution with elapse of time are small. It is particularly useful for the removal of virus from a protein solution and greatly contributes in industry.

The invention claimed is:

1. A porous hollow fiber membrane comprising
    a filtration outer surface having dot-shaped or slit-shaped pores,
    a filtration inner surface having a network structure or a fine particle aggregate structure,
    an in-plane side region, a central region, and an out-plane side region of the membrane are composed of a substantially homogeneous structure, the central region defined as a region between a position which is outer surface side from the inner surface in a distance corresponding to 20% of a membrane thickness and a position which is inner surface side from the outer surface in a distance 20% of the membrane thickness, and
    a membrane wall having a structure having substantially no macrovoids, wherein the porous hollow fiber membrane has a permeability for pure water of 10 to 300 L/(h·m²·bar), wherein the porous hollow fiber membrane has an inner diameter of 200 to 400 μm and the membrane thickness is 50 to 200 μm, wherein the porous hollow fiber membrane has a permeability for a 0.1% by weight solution of bovine γ-globulin of 30 to 100% of the permeability for pure water, and wherein the porous hollow fiber membrane contains a hydrophobic polymer and a hydrophilic polymer, and the hydrophobic polymer is polysulfone or polyether sulfone.

2. The porous hollow fiber membrane according to claim 1, wherein the hydrophilic polymer is polyvinylpyrrolidone.

3. The porous hollow fiber membrane according to claim 1, wherein the porous hollow fiber membrane is capable of separating a virus from a protein solution.

4. A porous hollow fiber membrane for the treatment of a protein-containing liquid, comprising
a filtration outer surface having dot-shaped or slit-shaped pores,
a filtration inner surface having a network structure or a fine particle aggregate structure,
a central region comprising a substantially homogeneous structure, the central region defined as a region between a position which is outer surface side from the inner surface in a distance corresponding to 20% of a membrane thickness and a position which is inner surface side from the outer surface in a distance 20% of the membrane thickness,
a membrane wall comprising a structure having substantially no macrovoids,
wherein the permeability for pure water is 10 to 300 L/(h·m²·bar) and
the permeability for a 0.1% by weight solution of bovine γ-globulin in a 20 mmol/L phosphate buffer is 30 to 100% of the permeability for a 0.1% by weight solution of bovine γ-globulin in a 20 mmol/L phosphate-buffered physiological saline solution.

5. A method of separating a virus from a protein solution comprising filtering the protein solution containing the virus with the porous hollow fiber membrane of claim 1.

6. A method of separating a virus from a protein solution comprising filtering the protein solution containing a virus with the porous hollow fiber membrane of claim 4.

7. The porous hollow fiber membrane according to claim 1, wherein the membrane thickness is from 75 to 119 μm.

8. A porous hollow fiber membrane comprising
a filtration outer surface having dot-shaped or slit-shaped pores,
a filtration inner surface having a network structure or a fine particle aggregate structure,
an in-plane side region, a central region, and an out-plane side region of the membrane are composed of a substantially homogeneous structure, the central region defined as a region between a position which is outer surface side from the inner surface in a distance corresponding to 20% of a membrane thickness and a position which is inner surface side from the outer surface in a distance 20% of the membrane thickness, and
a membrane wall having a structure having substantially no macrovoids,
wherein the porous hollow fiber membrane has a permeability for pure water of 10 to 300 L/(h·m²·bar),
wherein the porous hollow fiber membrane has an inner diameter of 200 to 400 μm and the membrane thickness is 50 to 200 μm,
wherein the porous hollow fiber membrane has a permeability for a 0.1% by weight solution of bovine γ-globulin of 30 to 100% of the permeability for pure water,
wherein the porous hollow fiber membrane contains a hydrophobic polymer and a hydrophilic polymer, and the hydrophobic polymer is polysulfone or polyether sulfone, and
wherein the porous hollow fiber membrane has an immunoglobulin transmission rate of at least 94.8%.

9. The porous hollow fiber membrane according to claim 8, wherein the hydrophilic polymer is polyvinylpyrrolidone.

10. The porous hollow fiber membrane according to claim 8, wherein the porous hollow fiber membrane is capable of separating a virus from a protein solution.

11. The porous hollow fiber membrane according to claim 8, wherein the membrane thickness is from 75 to 119 μm.

* * * * *